US010666898B2

United States Patent
Soneda et al.

(10) Patent No.: US 10,666,898 B2
(45) Date of Patent: May 26, 2020

(54) COMMUNICATION MANAGEMENT SYSTEM, COMMUNICATION SYSTEM, AND COMMUNICATION METHOD

(71) Applicant: Ricoh Company, Ltd., Tokyo (JP)

(72) Inventors: Takuya Soneda, Kanagawa (JP); Takafumi Takeda, Tokyo (JP); Kenichiro Morita, Tokyo (JP); Hidekuni Annaka, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/355,752

(22) Filed: Mar. 17, 2019

(65) Prior Publication Data
US 2019/0306458 A1 Oct. 3, 2019

(30) Foreign Application Priority Data

Mar. 30, 2018 (JP) .................................. 2018-068836

(51) Int. Cl.
*H04N 7/14* (2006.01)
*H04L 29/06* (2006.01)
(Continued)

(52) U.S. Cl.
CPC ......... *H04N 7/147* (2013.01); *H04L 65/4053* (2013.01); *H04N 5/23238* (2013.01); *H04N 7/157* (2013.01)

(58) Field of Classification Search
USPC ...................................................... 348/14.01
See application file for complete search history.

(56) References Cited

U.S. PATENT DOCUMENTS

2011/0157215 A1* 6/2011 Aoyagi .................. G06F 3/147
345/593
2013/0326419 A1* 12/2013 Harada ............... G06F 3/04817
715/838
(Continued)

FOREIGN PATENT DOCUMENTS

JP 2002-034009 1/2002
JP 2011-223076 11/2011
(Continued)

OTHER PUBLICATIONS

U.S. Appl. No. 16/103,344, filed Aug. 14, 2018 Mayu Hakata, et al.
(Continued)

*Primary Examiner* — Maria El-Zoobi
(74) *Attorney, Agent, or Firm* — Xsensus LLP

(57) ABSTRACT

A communication management system relays communication between a first communication terminal that transmits data of a spherical image and a plurality of second communication terminals. The communication management system includes a memory and circuitry. The memory stores session identification information in association with addresses of communication terminals participating in the video communication session. The circuitry receives, from the first communication terminal, particular session identification information identifying a particular video communication session, and a display control parameter for limiting a display area of the spherical image to be displayed by each of the plurality of second communication terminals in the particular video communication session to a part of an entire area of the spherical image. The circuitry transmits the display control parameter to each of the addresses stored in the memory in association with the particular session identification information other than an address of the first communication terminal.

8 Claims, 31 Drawing Sheets

(51) Int. Cl.
*H04N 5/232* (2006.01)
*H04N 7/15* (2006.01)

(56) References Cited

U.S. PATENT DOCUMENTS

| | | |
|---|---|---|
| 2014/0152852 A1* | 6/2014 | Ito .................. H04N 1/00137 |
| | | 348/207.1 |
| 2014/0267215 A1* | 9/2014 | Soni .................. G09G 3/3233 |
| | | 345/212 |
| 2017/0078616 A1* | 3/2017 | Uchiyama ............... H04N 7/15 |
| 2018/0097682 A1 | 4/2018 | Yoshida et al. |
| 2018/0098105 A1 | 4/2018 | Morita et al. |
| 2018/0191787 A1 | 7/2018 | Morita et al. |

FOREIGN PATENT DOCUMENTS

| | | |
|---|---|---|
| JP | 2012-100185 | 5/2012 |
| JP | 2012-178135 | 9/2012 |

OTHER PUBLICATIONS

U.S. Appl. No. 16/131,373, filed Sep. 14, 2018 Takuya Soneda, et al.

U.S. Appl. No. 16/140,945, filed Sep. 25, 2018 Yohhei Ohmura, et al.

* cited by examiner

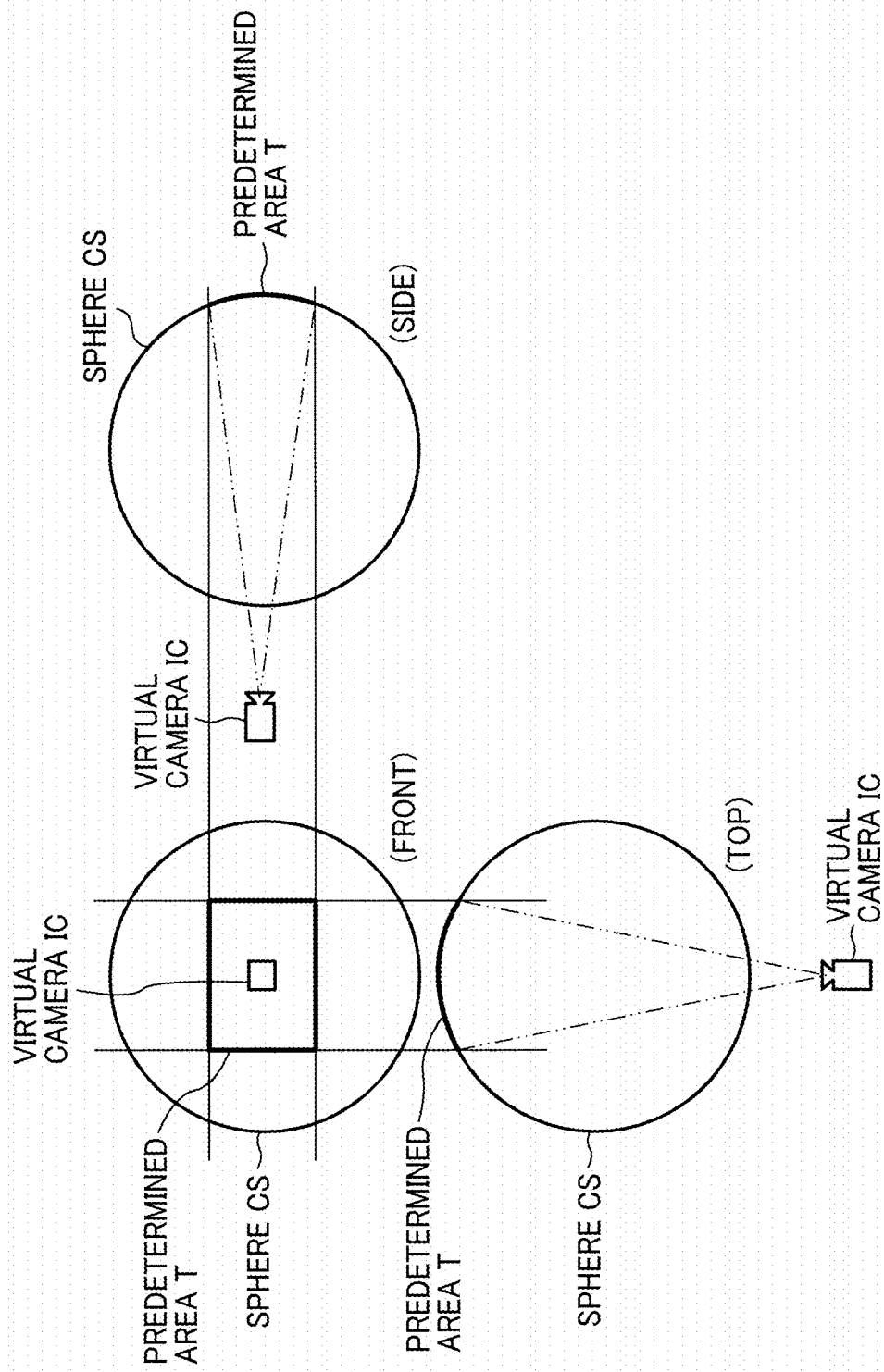

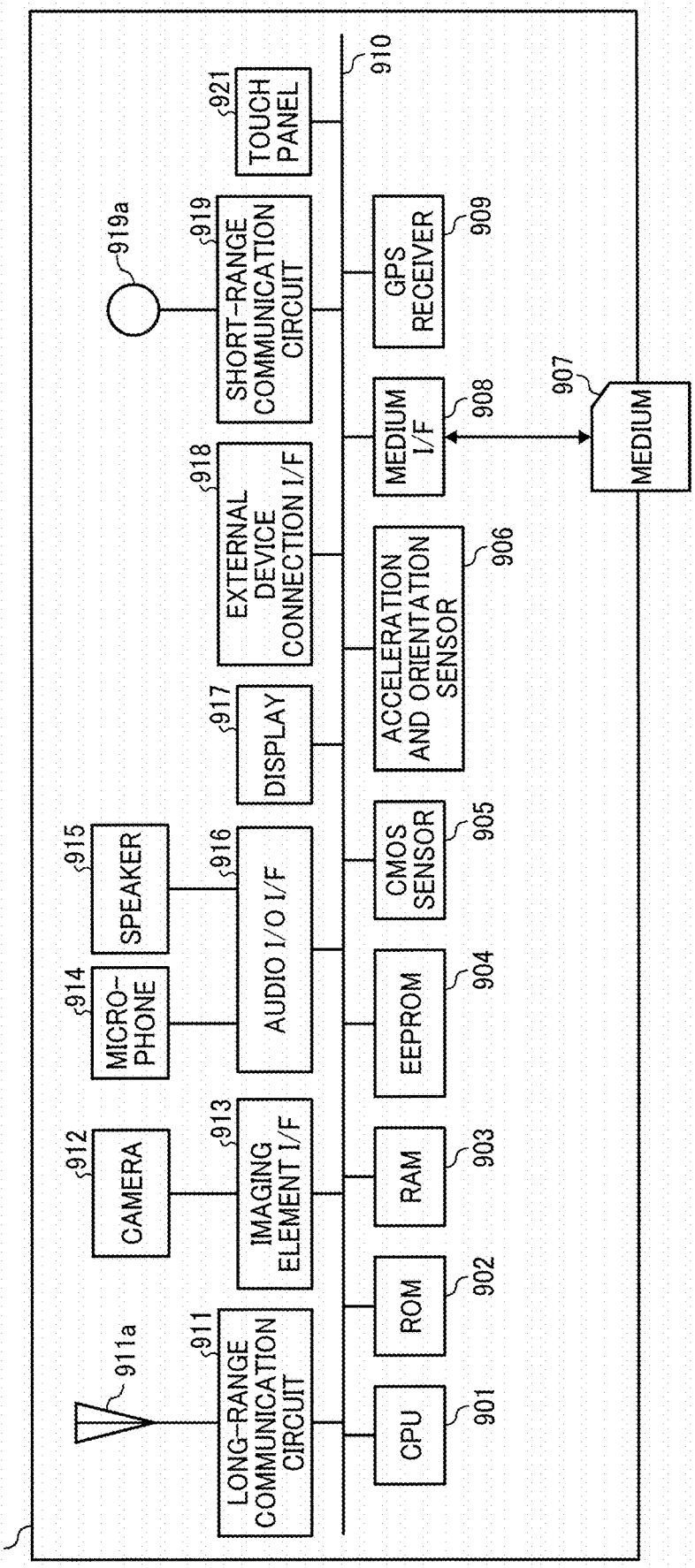

IMAGE TYPE MANAGEMENT TABLE

| IMAGE DATA ID | IP ADDRESS SENDER TERMINAL | SOURCE NAME (IMAGE TYPE INFORMATION) |
|---|---|---|
| RS001 | 1.2.1.3 | Video_Theta |
| RS002 | 1.2.2.3 | Video |
| RS003 | 1.3.1.3 | Video_Theta |
| RS004 | 1.2.1.4 | Video |
| RS005 | 1.3.1.4 | Video_Theta |
| ... | ... | ... |

FIG. 16

IMAGE CAPTURING DEVICE MANAGEMENT TABLE

| VENDER ID AND PRODUCT ID OF GUID OF IMAGE CAPTURING DEVICE |
|---|
| vid_05ca&pid_2711 |
| vid_05ca&pid_3822 |
| ... |

FIG. 17

APPLIED DISPLAY LIMIT MANAGEMENT TABLE

| IP ADDRESS OF SENDER TERMINAL | DISPLAY CONTROL PARAMETER ||||
|---|---|---|---|---|
| | PERMITTED RANGE (MOVING RADIUS) r | PERMITTED RANGE (POLAR ANGLE) θ | PERMITTED RANGE (AZIMUTH) φ | PERMITTED RANGE (VIEWING ANGLE) α |
| 1.3.1.1 | - | - | - | α > 120° |
| 1.3.1.2 | - | - | - | - |
| ... | ... | ... | ... | ... |

FIG. 18

SESSION MANAGEMENT TABLE

| SESSION ID | IP ADDRESS OF PARTICIPATING TERMINAL |
|---|---|
| se101 | 1.2.1.3, 1.2.2.3, 1.3.1.3 |
| se102 | 1.2.1.3, 1.2.2.3, 1.3.1.3 |
| ... | ... |

FIG. 19

IMAGE TYPE MANAGEMENT TABLE

| SESSION ID | IMAGE DATA ID | IP ADDRESS OF SENDER TERMINAL | SOURCE NAME (IMAGE TYPE INFORMATION) |
|---|---|---|---|
| se101 | RS001 | 1.2.1.3 | Video_Theta |
| se101 | RS002 | 1.2.2.3 | Video |
| se101 | RS003 | 1.3.1.3 | Video_Theta |
| se102 | RS004 | 1.2.1.4 | Video |
| se102 | RS005 | 1.3.1.4 | Video_Theta |
| ... | ... | ... | ... |

FIG. 20

ALL DISPLAY LIMITS MANAGEMENT TABLE

DISPLAY CONTROL PARAMETER

| IP ADDRESS OF SENDER TERMINAL | PERMITTED RANGE (MOVING RADIUS) r | PERMITTED RANGE (POLAR ANGLE) θ | PERMITTED RANGE (AZIMUTH) φ | PERMITTED RANGE (VIEWING ANGLE) α |
|---|---|---|---|---|
| 1.2.2.3 | – | – | – | – |
| 1.3.1.3 | – | – | – | α > 120° |
| … | … | … | … | … |

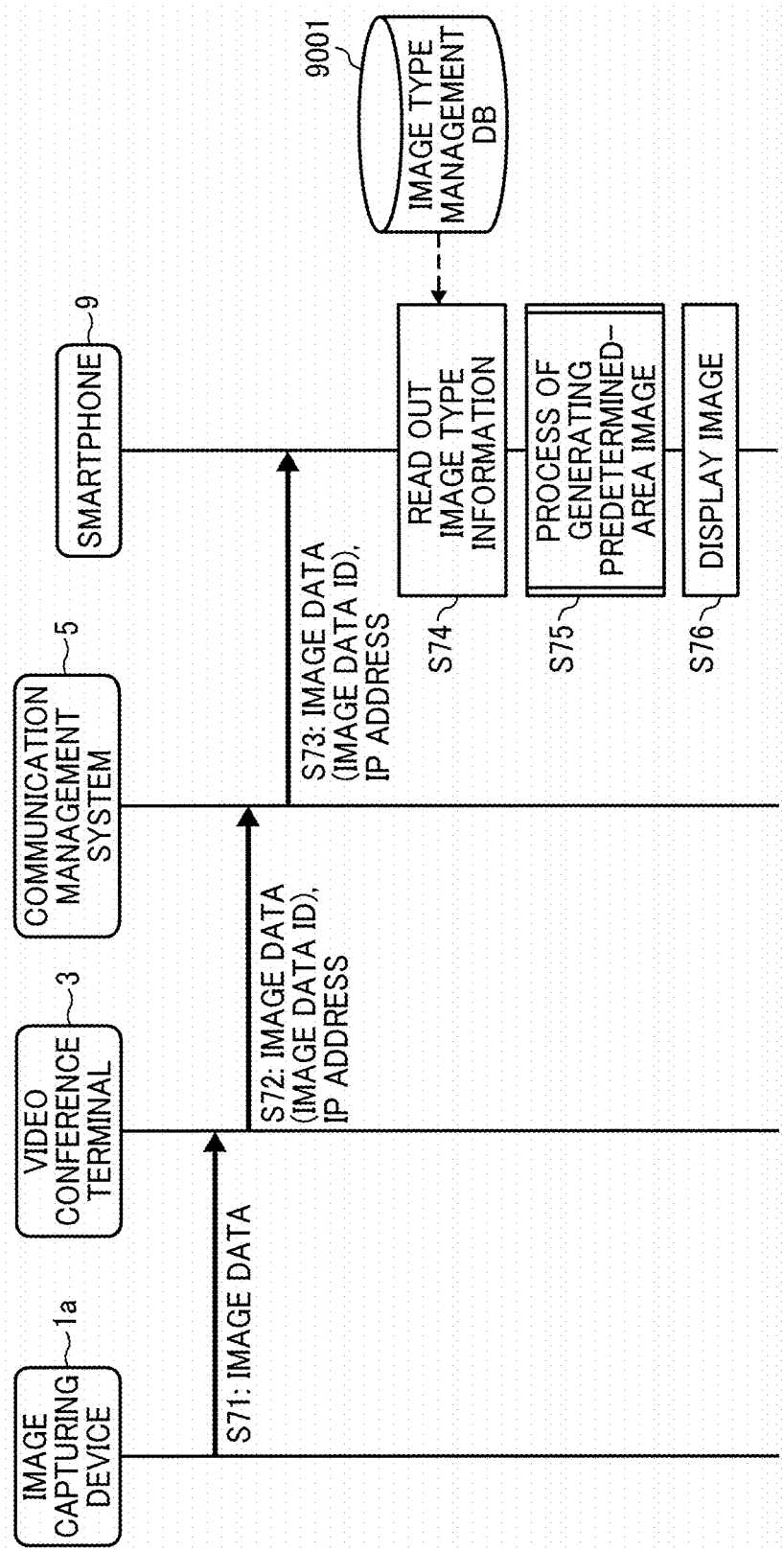

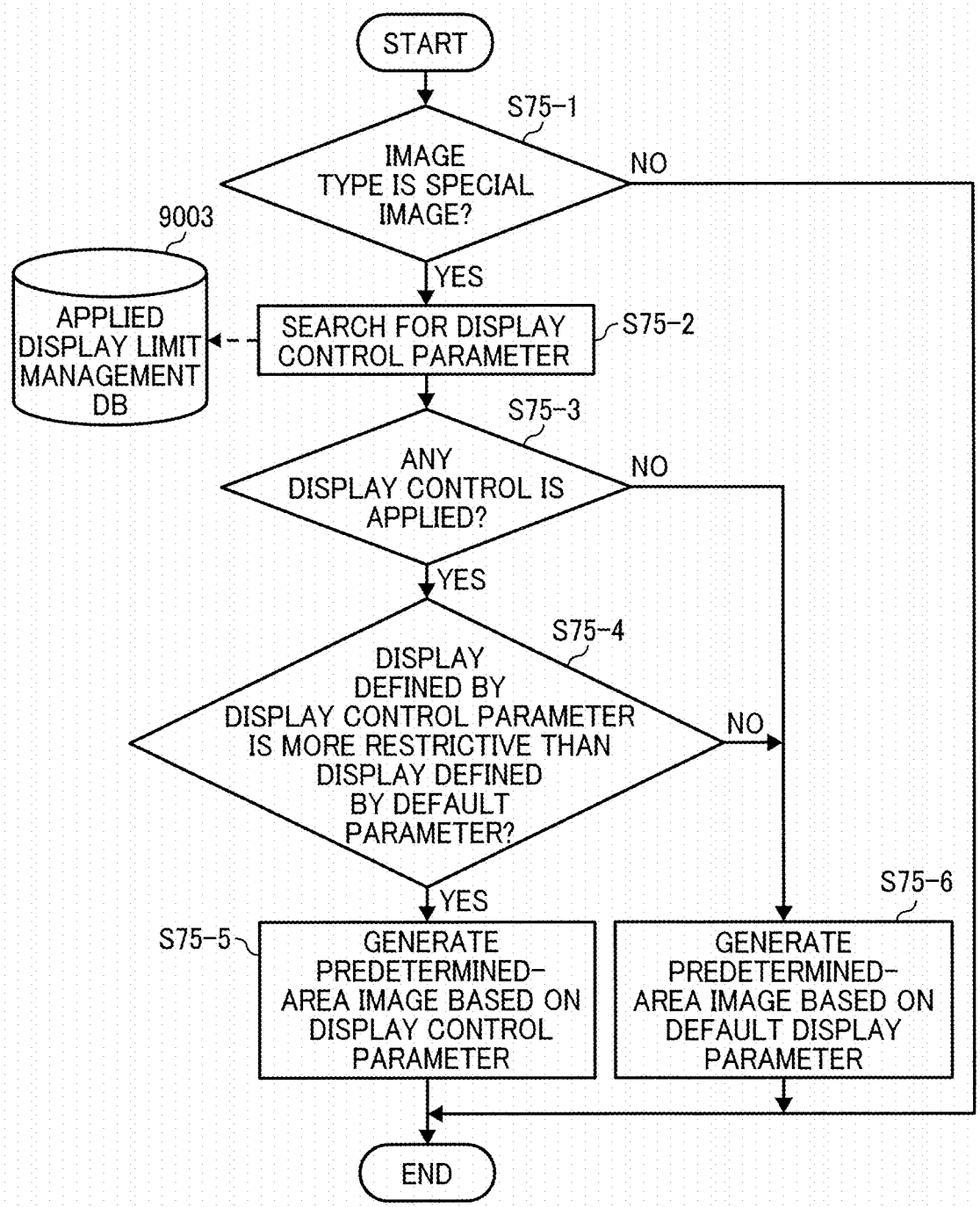

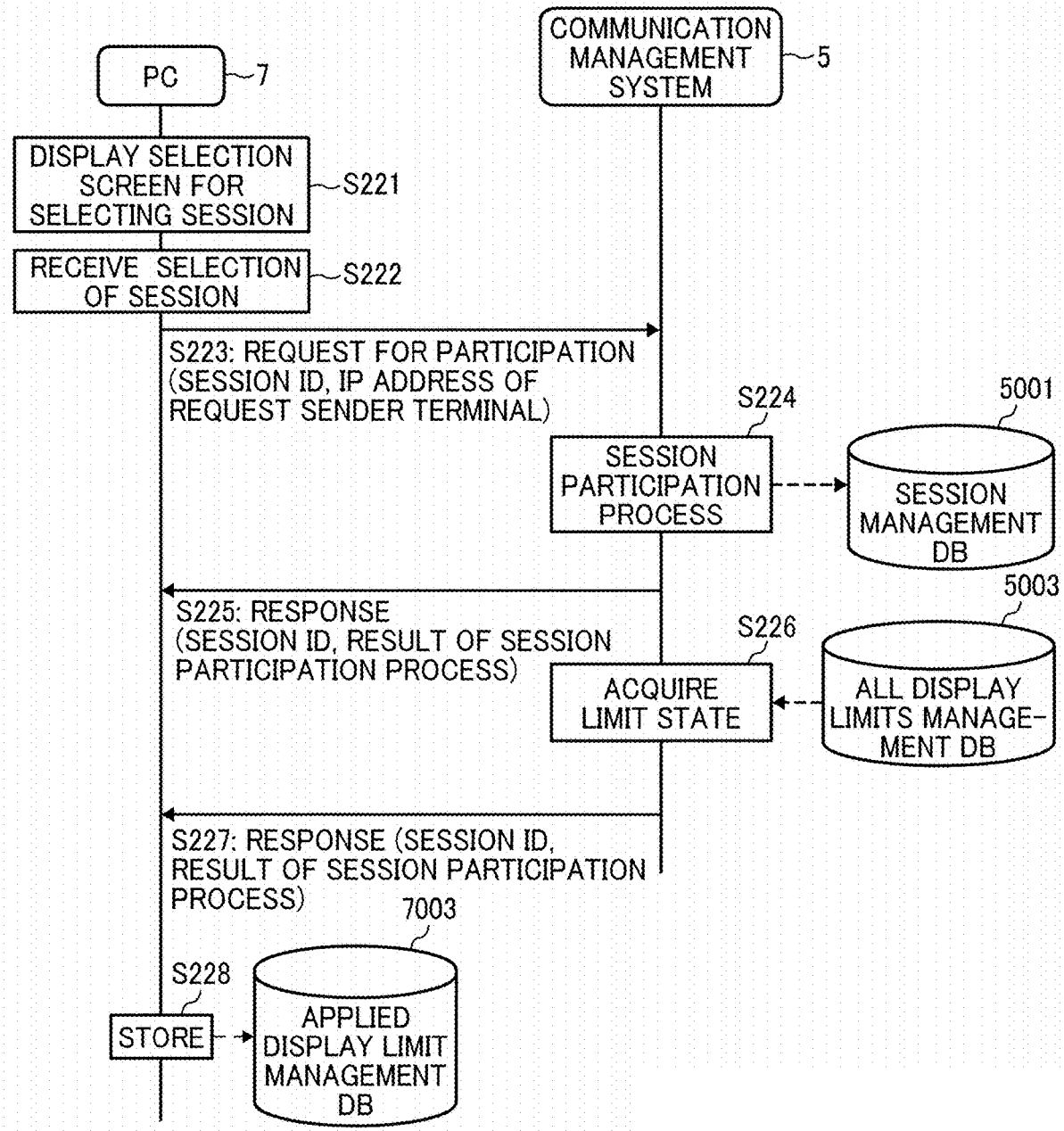

COMMUNICATION MANAGEMENT SYSTEM, COMMUNICATION SYSTEM, AND COMMUNICATION METHOD

CROSS-REFERENCE TO RELATED APPLICATION

This patent application is based on and claims priority pursuant to 35 U.S.C. § 119(a) to Japanese Patent Application No. 2018-068836, filed on Mar. 30, 2018, the entire disclosure of which is incorporated herein by reference.

BACKGROUND

Technical Field

The present disclosure relates to a communication management system, a communication system, and a communication method.

Description of the Related Art

Videoconference systems are now in widespread use, allowing users at remote places to hold a remote conference via a communication network such as the Internet. In such videoconference systems, a communication terminal for a videoconference system is provided in a meeting room where attendants of one party in a remote conference are attending. This communication terminal collects an image or video of the meeting room including the attendants and sound such as speech made by the attendants, and transmits digital data converted from the collected image (video) and/or sound to the other party's communication terminal provided at a different meeting room. Based on the transmitted digital data, the other party's terminal displays images on a display or outputs audio from a speaker in the different conference room to establish video communication (video calling). This enables to carry out a conference among remote sites, in a state close to an actual conference.

In addition, a technique is known that connects, to a communication terminal, an image capturing device that is configured to capture a spherical panoramic image in real time, and distributes the spherical (panoramic) image acquired by the image capturing device from the communication terminal to each of communication terminals of the other party. Each of the communication terminals of the other party sequentially converts the received spherical image to a rectangular planar image and displays the rectangular planar image on a display.

Further, a system is known in which a communication terminal and a device configured to acquire image data in real time are provided in an office, and another terminal provided in a remote place such as at home where an employee is working remotely is communicably connected to the communication terminal in the office. This system allows the employee to recognize the state of the employee at any desired time and allows a user in the office to recognize the status of employee who is working remotely at any desired time.

Furthermore, a system is known that recognizes a state of a user on a receiving side by image recognition, and suspends or cancels videoconference communication according to the recognized state.

SUMMARY

A communication management system relays communication between a first communication terminal that transmits data of a spherical image and a plurality of second communication terminals each of which receives the data of the spherical image. The communication management system includes a memory and circuitry. The memory stores session identification information for identifying a video communication session in association with addresses of communication terminals participating in the video communication session. The circuitry receives, from the first communication terminal, particular session identification information identifying a particular video communication session, and a display control parameter for limiting a display area of the spherical image to be displayed by each of the plurality of second communication terminals in the particular video communication session to a part of an entire area of the spherical image. The circuitry transmits the display control parameter to each of the addresses stored in the memory in association with the particular session identification information other than an address of the first communication terminal.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 5 is an illustration of relative positions of a virtual camera and a predetermined area in a case where the spherical panoramic image is represented as a three-dimensional sphere, according to an embodiment of the present disclosure;

FIG. 13 is a block diagram illustrating a hardware configuration of a smartphone, according to an embodiment of the present disclosure;

FIG. 15 is a conceptual diagram illustrating an image type management table, according to an embodiment of the present disclosure;

FIG. 16 is a conceptual diagram illustrating an image capturing device management table, according to an embodiment of the present disclosure;

FIG. 17 is a conceptual diagram illustrating an applied display limit management table, according to an embodiment of the present disclosure;

FIG. 18 is a conceptual diagram illustrating a session management table, according to an embodiment of the present disclosure;

FIG. 19 is a conceptual diagram illustrating an image type management table, according to an embodiment of the present disclosure;

FIG. 20 is a conceptual diagram illustrating an all display limits management table, according to an embodiment of the present disclosure;

FIG. 24 is a sequence diagram illustrating an operation of transmitting image data in video communication, according to an embodiment of the present disclosure;

FIG. 25 is a flowchart illustrating steps in an operation of generating the predetermined-area image, according to an embodiment of the present disclosure;

FIG. 33 is a sequence diagram illustrating an operation of participating in a specific communication session in which a setting of a display control parameter is applied, according to an embodiment of the present disclosure;

Figure 1:
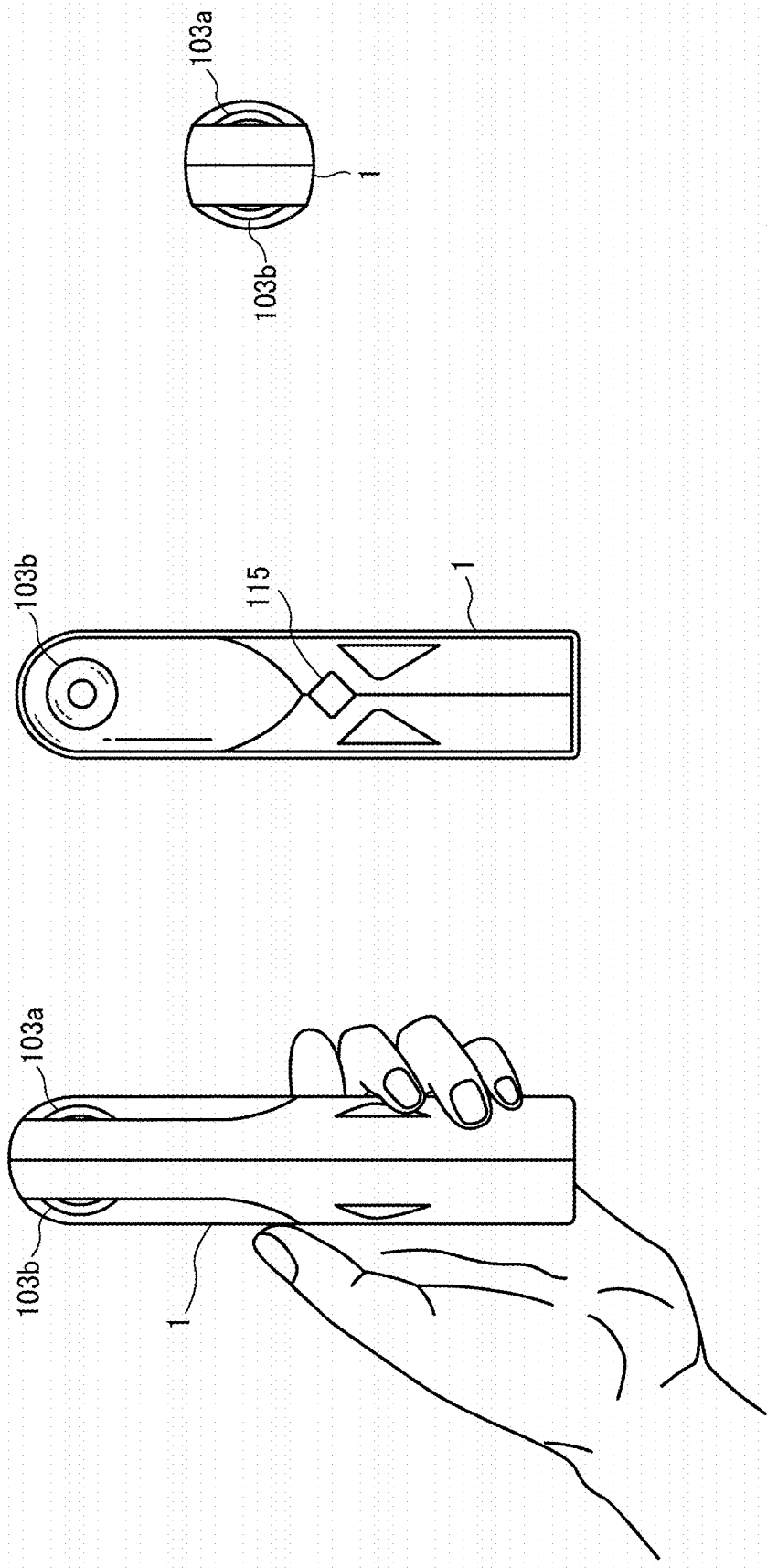
FIG. 1A is a left side view of an image capturing device, according to an embodiment of the present disclosure.
FIG. 1B is a front view of the image capturing device of FIG. 1A.
FIG. 1C is a plan view of the image capturing device of FIG. 1A.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present disclosure are described.

Overview of Embodiment

<Generation of Spherical Panoramic Image>

Referring to FIG. 1 (FIGS. 1A to 1C) to FIG. 8, a description is given of generating a spherical panoramic image.

First, a description is given of an external view of an image capturing device 1, with reference to FIG. 1A to FIG. 1C. The image capturing device 1 is a digital camera for capturing images from which a spherical image is generated. In one example, the spherical image captured by the image capturing device 1 is a 360-degree spherical panoramic image (full-view spherical image). FIGS. 1A, 1B and 1C are respectively a left side view, a front view, and a plan view (top view) of the image capturing device 1.

As illustrated in FIG. 1A, the image capturing device 1 has a shape such that one can hold it with one hand. Further, as illustrated in FIGS. 1A, 1B, and 1C, an imaging element 103a is provided on a front side (anterior side) of an upper section of the image capturing device 1, and an imaging element 103b is provided on a back side (rear side) thereof. These imaging elements (image sensors) 103a and 103b are used in combination with optical members (e.g., fisheye lenses 102a and 102b, described below), each being configured to capture a hemispherical image having an angle of view of 180 degrees or wider. As illustrated in FIG. 1B, the image capturing device 1 further includes an operation unit 115 such as a shutter button on the rear side of the image capturing device 1, which is opposite of the front side of the image capturing device 1.

Figure 2:
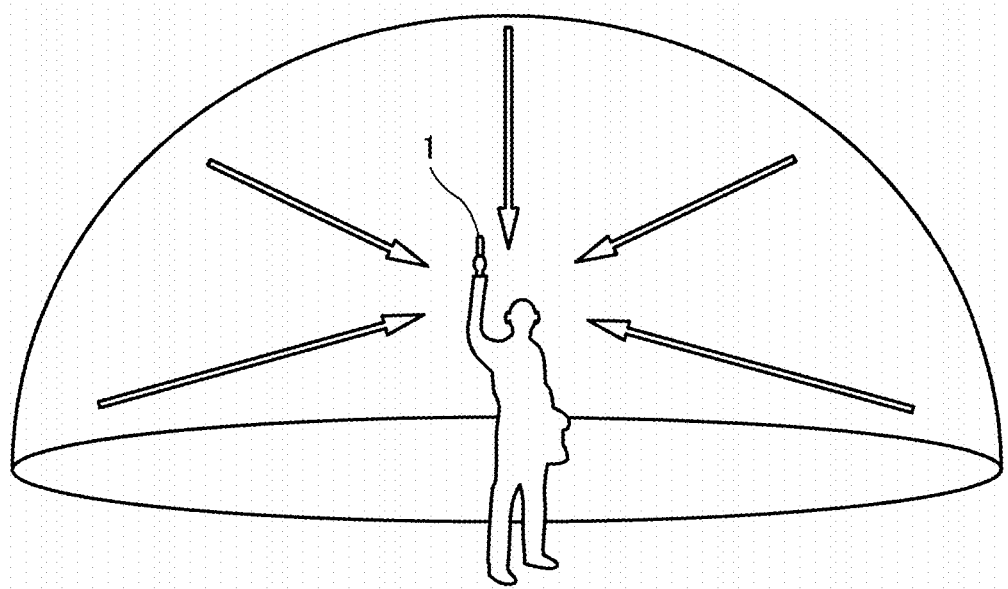
FIG. 2 is an illustration of how a user uses the image capturing device, according to an embodiment of the present disclosure.

Next, a description is given of a situation where the image capturing device 1 is used, with reference to FIG. 2. FIG. 2 illustrates an example of how a user uses the image capturing device 1. As illustrated in FIG. 2, for example, the image capturing device 1 is used for capturing objects surrounding a user who is holding the image capturing device 1 in his or her hand. The imaging elements 103a and 103b illustrated in FIGS. 1A to 1C capture the objects surrounding the user to obtain two hemispherical images.

Figure 3A:
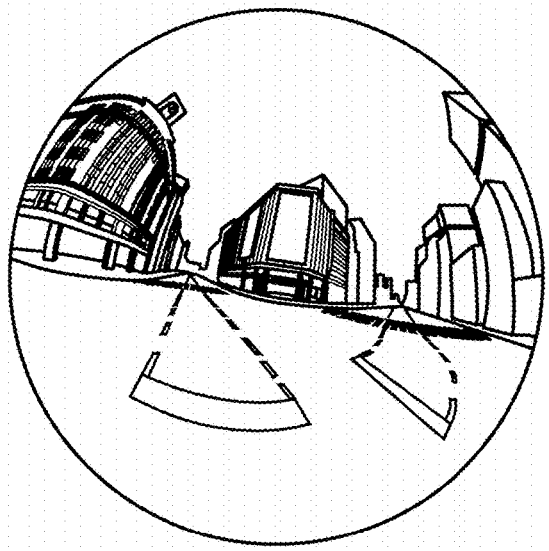
FIG. 3A is an illustration of a front side of a hemispherical image captured by the image capturing device, according to an embodiment of the present disclosure.
Figure 3B:
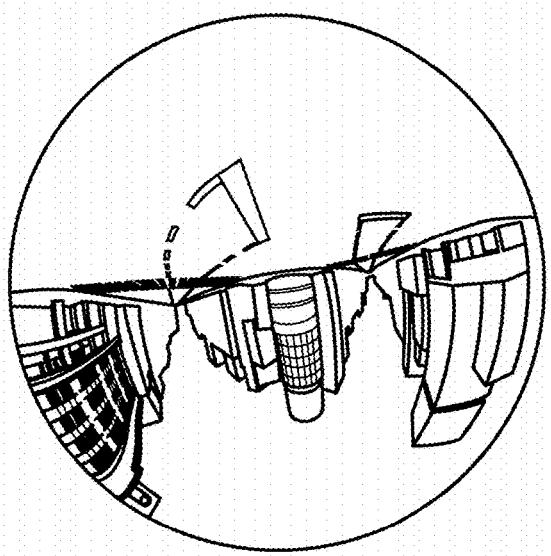
FIG. 3B is an illustration of a back side of a hemispherical image captured by the image capturing device, according to an embodiment of the present disclosure.
Figure 3C:
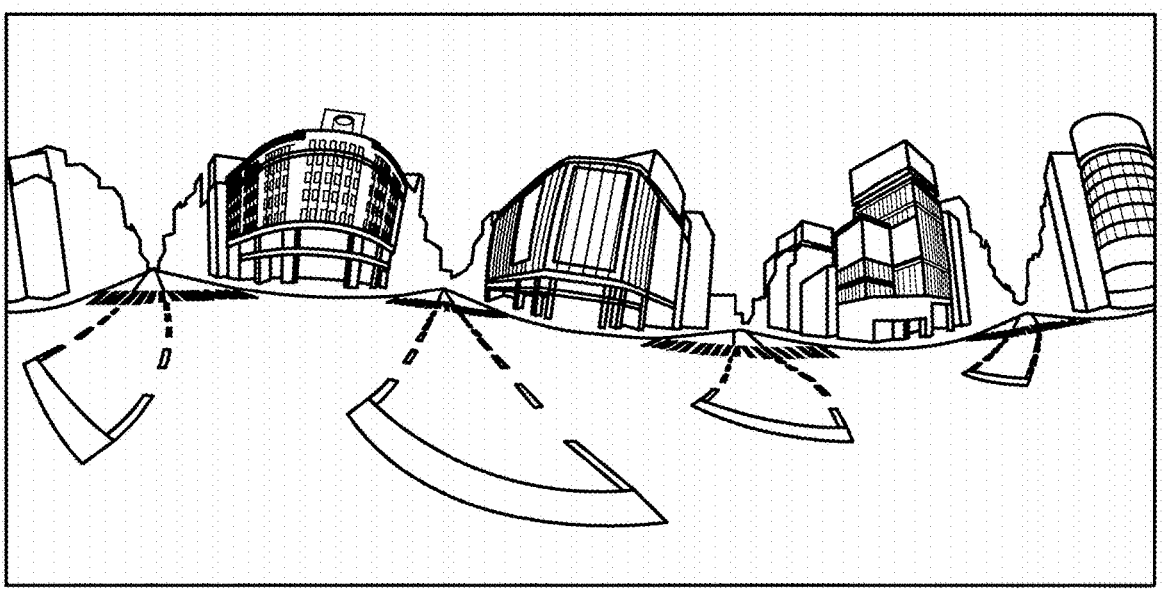
FIG. 3C is an illustration of an image captured by the image capturing device represented by Mercator projection, according to an embodiment of the present disclosure.
Figure 4B:
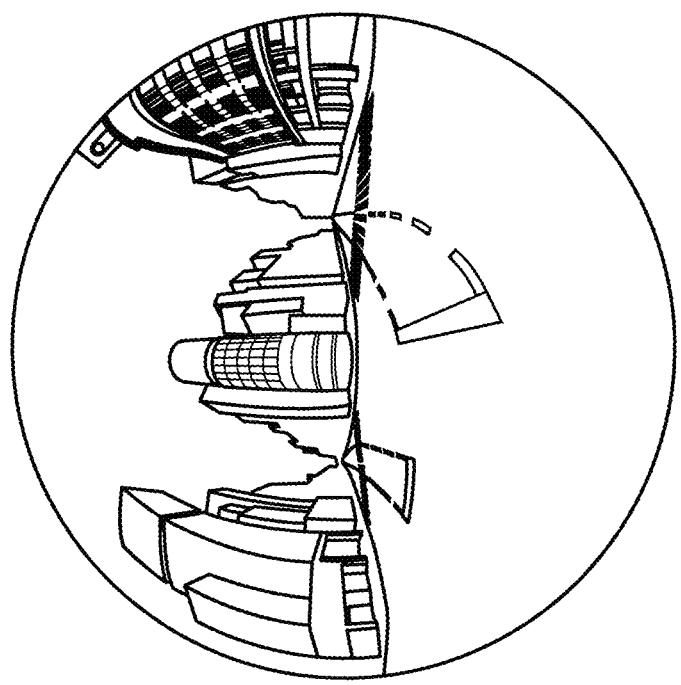
FIG. 4B is an illustration of a spherical panoramic image, according to an embodiment of the present disclosure.
Figure 4A:
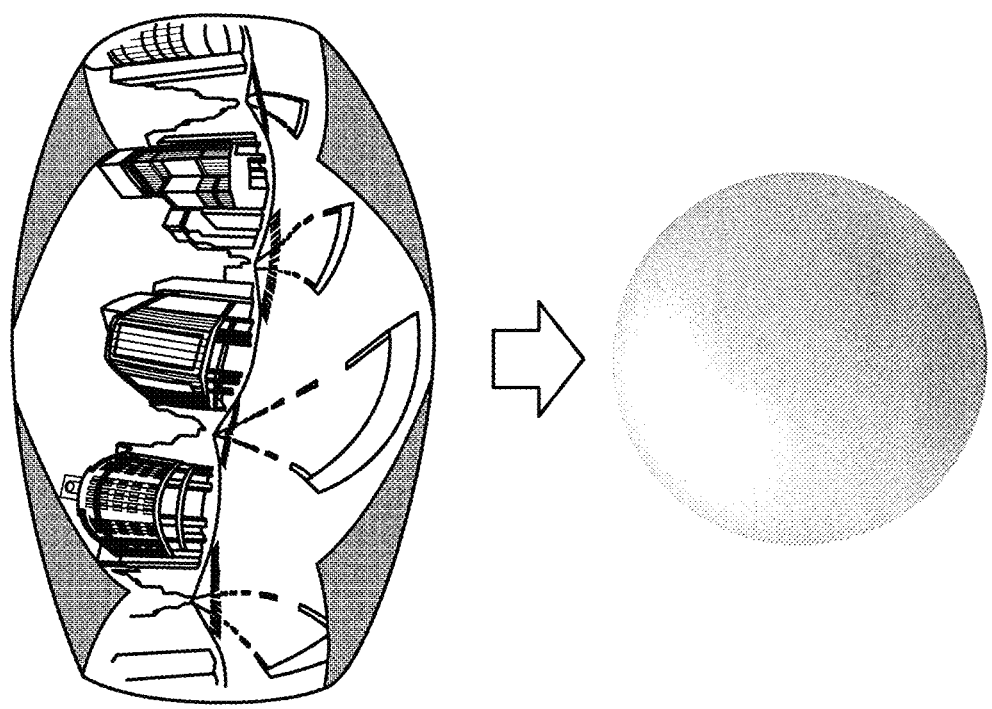
FIG. 4A is an illustration of a Mercator image covering a sphere, according to an embodiment of the present disclosure.

Next, a description is given of an overview of an operation of generating a spherical panoramic image from the images captured by the image capturing device 1, with reference to FIGS. 3A to 3C and FIGS. 4A and 4B. FIG. 3A is a view illustrating a hemispherical image (front side) captured by the image capturing device 1. FIG. 3B is a view illustrating a hemispherical image (back side) captured by the image capturing device 1. FIG. 3C is a view illustrating an image in Mercator projection. The image in Mercator projection as illustrated in FIG. 3C is referred to as a "Mercator image" hereinafter. FIG. 4A is a conceptual diagram illustrating an example of how the Mercator image maps to a surface of a sphere. FIG. 4B is a view illustrating a spherical panoramic image.

As illustrated in FIG. 3A, an image captured by the imaging element 103a is a curved hemispherical image (front side) taken through the fisheye lens 102a described later. In addition, as illustrated in FIG. 3B, an image captured by the imaging element 103b is a curved hemispherical image (back side) taken through the fisheye lens 102b described later. The image capturing device 1 combines one hemispherical image (front side) and the other hemispherical image (back side), which is reversed by 180-degree, to generate the Mercator image as illustrated in FIG. 3C.

The Mercator image is mapped on the sphere surface using Open Graphics Library for Embedded Systems (OpenGL ES) as illustrated in FIG. 4A. This results in generation of the spherical panoramic image as illustrated in FIG. 4B. In other words, the spherical panoramic image is represented as the Mercator image, which corresponds to a surface facing a center of the sphere. OpenGL ES is a graphic library used for visualizing two-dimensional (2D) and three-dimensional (3D) data. The spherical panoramic image is either a still image or a moving image.

One may feel strange viewing the spherical panoramic image, because the spherical panoramic image is an image mapped to the sphere surface. To resolve this strange feeling, an image of a predetermined area, which is a part of the spherical panoramic image, is displayed as a planar (flat) image having fewer curves. In this disclosure, the image of the predetermined area is referred to as a "predetermined-area image". Hereinafter, a description is given of displaying the predetermined-area image, with reference to FIG. 5 and FIGS. 6A to 6C.

Figure 6A:
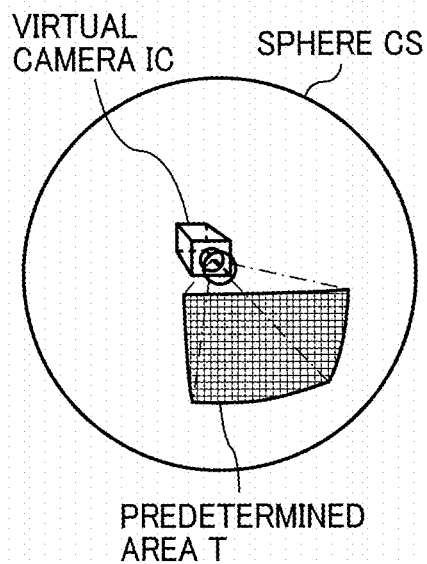
FIG. 6A is a perspective view of FIG. 5.
Figure 6B:
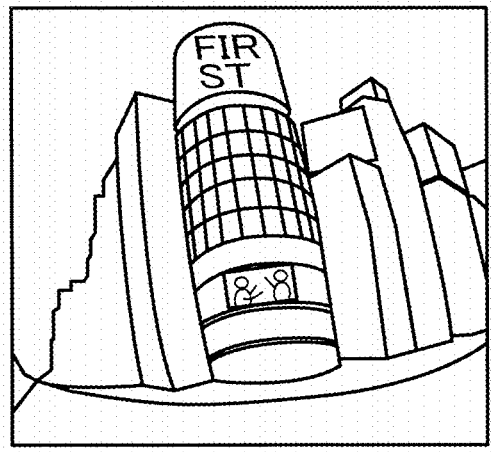
FIG. 6B is an illustration of an image of the predetermined area displayed on a display of a communication terminal, according to an embodiment of the present disclosure.
Figure 6C:
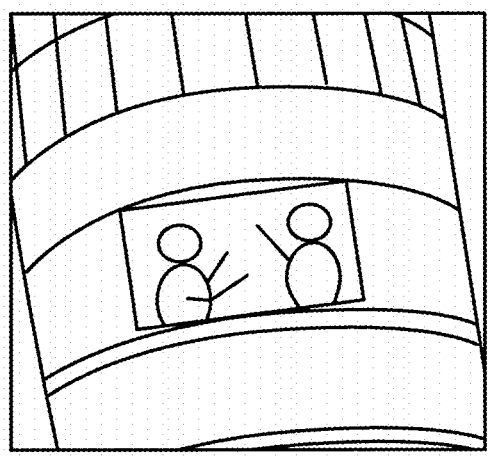
FIG. 6C is an illustration of another predetermined-area image when displayed by enlarging a partial area of the predetermined-area image illustrated in FIG. 6B.

FIG. 5 is an illustration of a positional relation between a virtual camera IC and the predetermined area T when the spherical panoramic image is represented as a surface area of three-dimensional solid sphere. The virtual camera IC corresponds to a position of a point of view (viewpoint) of a user who is viewing the spherical panoramic image represented as a surface area of the three-dimensional solid sphere CS. FIG. 6A is a perspective view of FIG. 5. FIG. 6B is a view illustrating an example of the predetermined-area image when displayed on a display. FIG. 6C is an example of an illustration of another predetermined-area image when displayed by enlarging (zooming) a partial area of the predetermined-area image illustrated in FIG. 6B.

In FIG. 6A, the spherical panoramic image illustrated in FIG. 4B is represented as a three-dimensional solid sphere CS. Assuming that the spherical panoramic image is a surface area of the solid sphere CS, the virtual camera IC is outside of the spherical panoramic image as illustrated in FIG. 5. The predetermined area T in the spherical panoramic image is an imaging area of the virtual camera IC. Specifically, the predetermined area T is specified by predetermined-area information indicating an imaging direction and an angle of view of the virtual camera IC in a three-dimensional virtual space containing the spherical panoramic image.

The predetermined-area image, which is an image of the predetermined area T illustrated in FIG. 6A, is displayed as an imaging area of the virtual camera IC on a display, as illustrated in FIG. 6B. FIG. 6B illustrates the predetermined-area image represented by the predetermined-area information (display parameter) that is set by default. In the following description of the embodiment, an imaging direction (ea, aa) and an angle of view a of the virtual camera IC are used.

Figure 7:
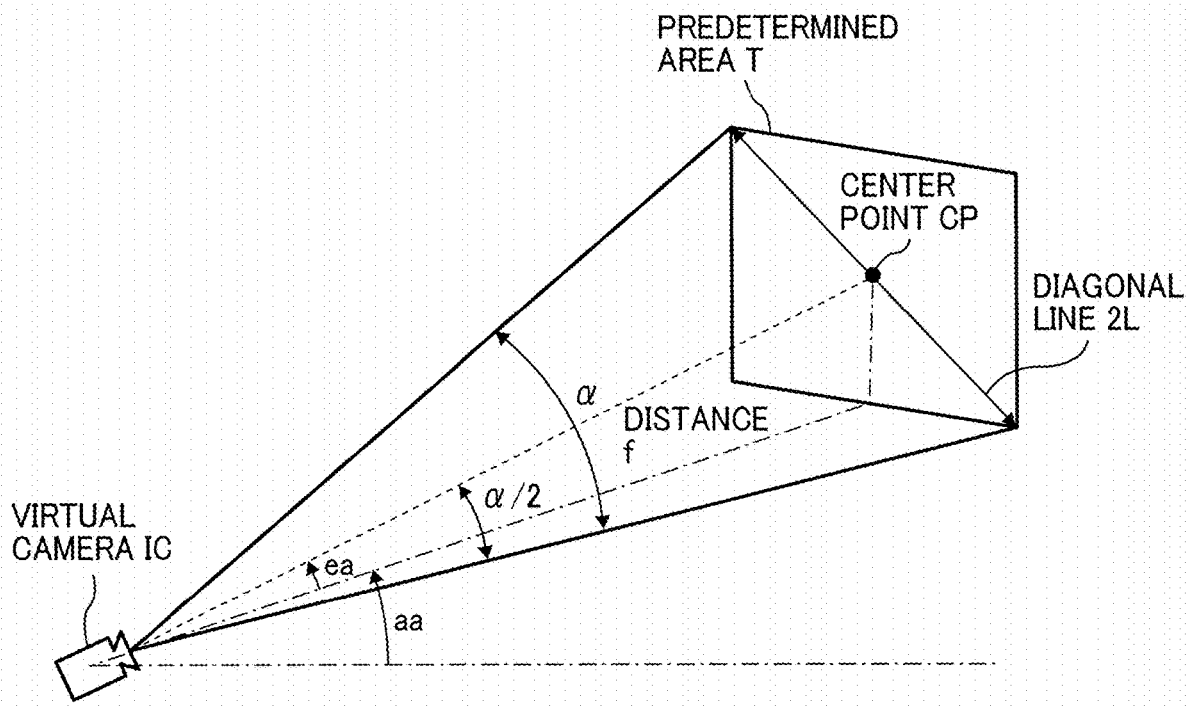
FIG. 7 is a diagram illustrating a relation between predetermined-area information and a predetermined area, according to an embodiment of the present disclosure.

Referring to FIG. 7, a relation between the predetermined-area information and an image of the predetermined area T is described according to the embodiment. FIG. 7 is a view illustrating a relation between the predetermined-area information and the predetermined area T. As illustrated in FIG. 7, "ea" denotes an elevation angle, "aa" denotes an azimuth angle, and "a" denotes an angle of view, respectively, of the virtual camera IC. The position of the virtual camera IC is adjusted, such that the point of gaze of the virtual camera IC, indicated by the imaging direction (ea, aa), matches the center point CP of the predetermined area T as the imaging area of the virtual camera IC. The predetermined-area image Q is an image of the predetermined area T, in the spherical image CE. Distance "f" denotes a distance from the virtual camera IC to the center point CP of the predetermined area T. L is a distance between the center point CP and a given vertex of the predetermined area T (2L is a diagonal line). In FIG. 7, a trigonometric function equation generally expressed by the following equation 1 is satisfied.

$$L/f = \tan(\alpha/2) \qquad \text{(Equation 1)}$$

Further, when a partial area of the predetermined-area image illustrated in FIG. 6B is enlarged, another predetermined-area image as illustrated in FIG. 6 is displayed.

Figure 8:
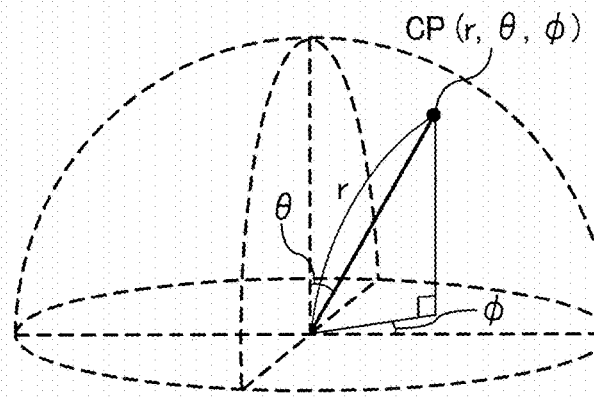
FIG. 8 is a diagram illustrating points in a three-dimensional Euclidean space according to spherical coordinates, according to an embodiment of the present disclosure.

FIG. 8 is a view illustrating points in a three-dimensional Euclidean space according to spherical coordinates, according to the embodiment. A positional coordinate (r, θ, φ) is given when the center point CP is represented by a spherical polar coordinate system. The positional coordinate (r, θ, φ) represents a moving radius, a polar angle, and an azimuth angle. The moving radius r is a distance from the origin of the three-dimensional virtual space including the spherical panoramic image to the center point CP. Accordingly, the moving radius r is equal to "f". FIG. 8 illustrates the relation between these items. In the following description of the embodiment, the positional coordinates (r, θ, φ) of the virtual camera IC is used.

<Overview of Image Communication System>

Figure 9:
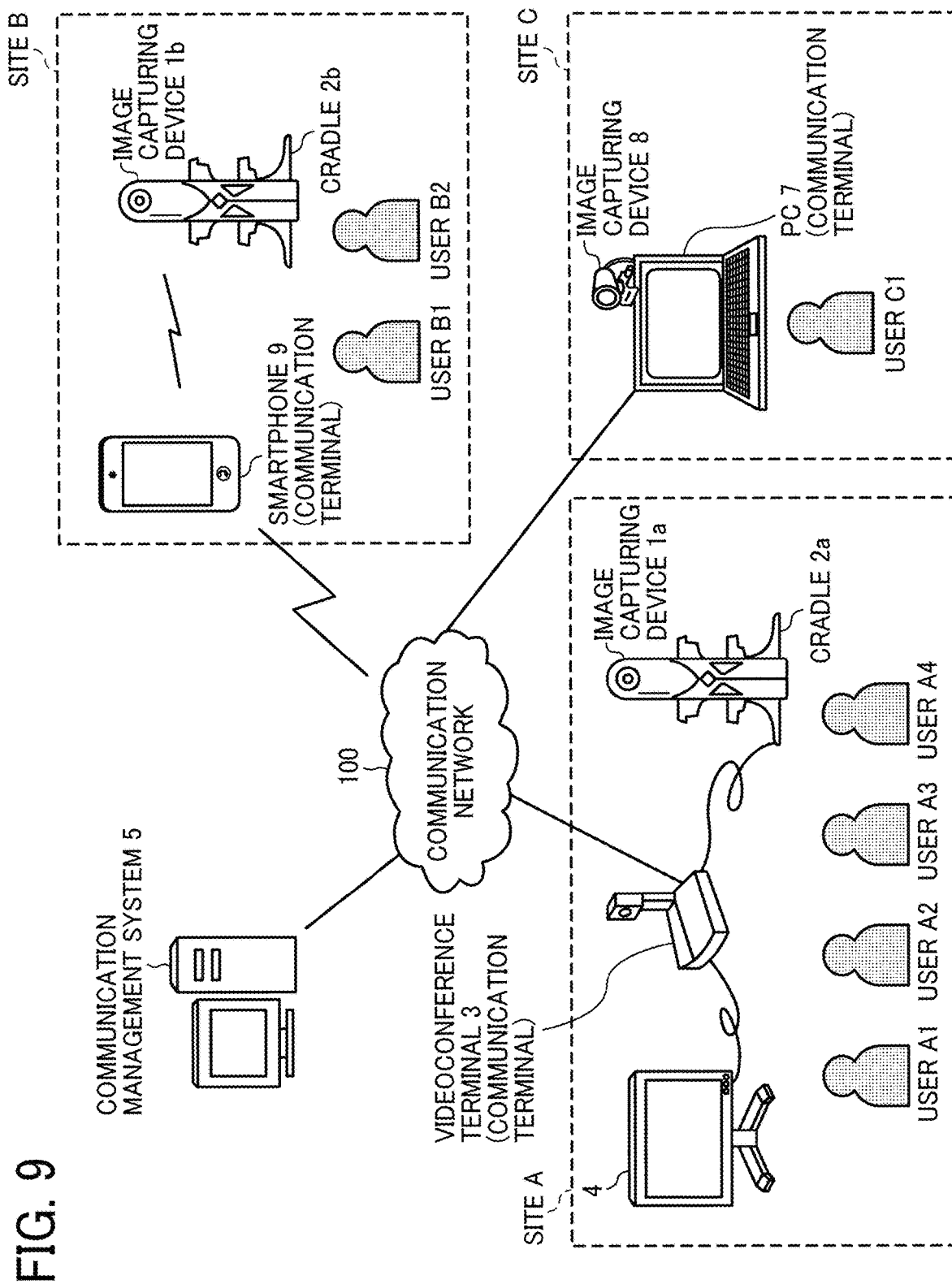
FIG. 9 is a schematic diagram illustrating a configuration of an image communication system, according to an embodiment of the present disclosure.

Referring to FIG. 9, an overview of a configuration of an image communication system according to the present embodiment is described. FIG. 9 is a schematic diagram illustrating a configuration of the image communication system according to the present embodiment.

As illustrated in FIG. 9, the image communication system according to the present embodiment includes an image capturing device 1a, an image capturing device 1b, a videoconference terminal 3, a communication management system 5, a personal computer (PC) 7, an image capturing device 8, and a smartphone 9. The videoconference terminal 3, the smartphone 9, and the PC 7 are communicably connected with one another via a communication network 100 such as the Internet. The communication network 100 can be either a wireless network or a wired network.

Each of the image capturing device 1a and the image capturing device 1b is a special digital camera, which captures an image of object or surroundings such as scenery to obtain two hemispherical images, from which a spherical panoramic image is generated. By contrast, the image capturing device 8 is a general-purpose digital camera that captures an image of object or surroundings to obtain a general planar image.

The videoconference terminal 3 is a terminal that is dedicated to videoconferencing. The videoconference terminal 3 displays an image of video communication (video calling) on a display 4, via a wired cable such as a universal serial bus (USB) cable. The videoconference terminal 3 usually captures an image by a camera 312, which is described later. However, when the videoconference terminal 3 is connected to a cradle 2a on which the image capturing device 1a is mounted, the image capturing device 1a is preferentially used. Accordingly, two hemispherical images are obtained, from which a spherical panoramic image is generated. When a wired cable is used for connecting the videoconference terminal 3 and the cradle 2a, the cradle 2a supplies power to the image capturing device 1a and holds the image capturing device 1a in addition to establishing communication between the image capturing device 1a and the videoconference terminal 3. In the embodiment, the image capturing device 1a, the cradle 2a, the videoconference terminal 3, and the display 4 are provided in the same site A. In the site A, four users A1, A2, A3 and A4 are participating in video communication.

The communication management system 5 manages communication among the videoconference terminal 3, the PC 7 and the smartphone 9. Further, the communication management system 5 manages types (a general image type and a special image type) of image data to be exchanged among the videoconference terminal 3, the PC 7 and the smartphone 9. In the embodiment, a special image is a spherical panoramic image, and a general image is a planar image. The communication management system 5 is provided, for example, at a service provider that provides video communication service. In one example, the communication management system 5 is configured as a single computer. In another example, the communication management system 5 is configured as a plurality of computers to which one or more units (functions, means, or storages) are arbitrarily allocated. In other words, the communication management system 5 can be implemented by a plurality of servers that operate in cooperation with one another.

The PC 7 performs video communication using the image capturing device 8 connected thereto. In the embodiment, the PC 7 and the image capturing device 8 are provided in the same site C. In the site C, one user C is participating in video communication.

The smartphone 9 includes a display 917, which is described later, and displays an image of video communication on the display 917. The smartphone 9 includes a complementary metal oxide semiconductor (CMOS) sensor 905, and usually captures an image using the CMOS sensor 905. In addition, the smartphone 9 is configured to obtain data of two hemispherical images captured by the image capturing device 1b, from which a spherical panoramic image is to be generated, using wireless communication such as Wireless Fidelity (Wi-Fi) and Bluetooth (registered trademark). When wireless communication is used for obtaining the data of two hemispherical images, a cradle 2b supplies power with the image capturing device 1b and holds the image capturing device 1b, but not establish a communication. In the embodiment, the image capturing device 1b, the cradle 2b, and the smartphone 9 are provided in the same site B. Further, in the site B, two users B1 and B2 are participating in video communication.

Each of the videoconference terminal 3, the PC 7 and the smartphone 9 is an example of a communication terminal. OpenGL ES is installed in each of the communication terminals to enable each of the communication terminals to generate predetermined-area information that indicates a partial area of a spherical panoramic image, or to generate a predetermined-area image from a spherical panoramic image that is transmitted from a different one of the communication terminals.

The arrangement of the terminals, apparatuses and users illustrated in FIG. 9 is just an example, and any other suitable arrangement will suffice. For example, an image capturing device configured to capture a spherical panoramic image can be used in place of the image capturing device 8 in the site C. In addition, examples of the communication terminal also include a digital television, a smartwatch, and a car navigation system. In the following description, any arbitrary one of the image capturing device 1a and the image capturing device 1b is referred to as "image capturing device 1".

Hardware Configuration of Embodiment

Hereinafter, a description is given of hardware configurations of the image capturing device 1, the videoconference terminal 3, the communication management system 5, the PC 7, and the smartphone 9, according to the present embodiment, with reference to FIG. 10 to FIG. 13. Since the image capturing device 8 is a general-purpose camera, a detailed description thereof is omitted.

<Hardware Configuration of Image Capturing Device 1>

Figure 10:
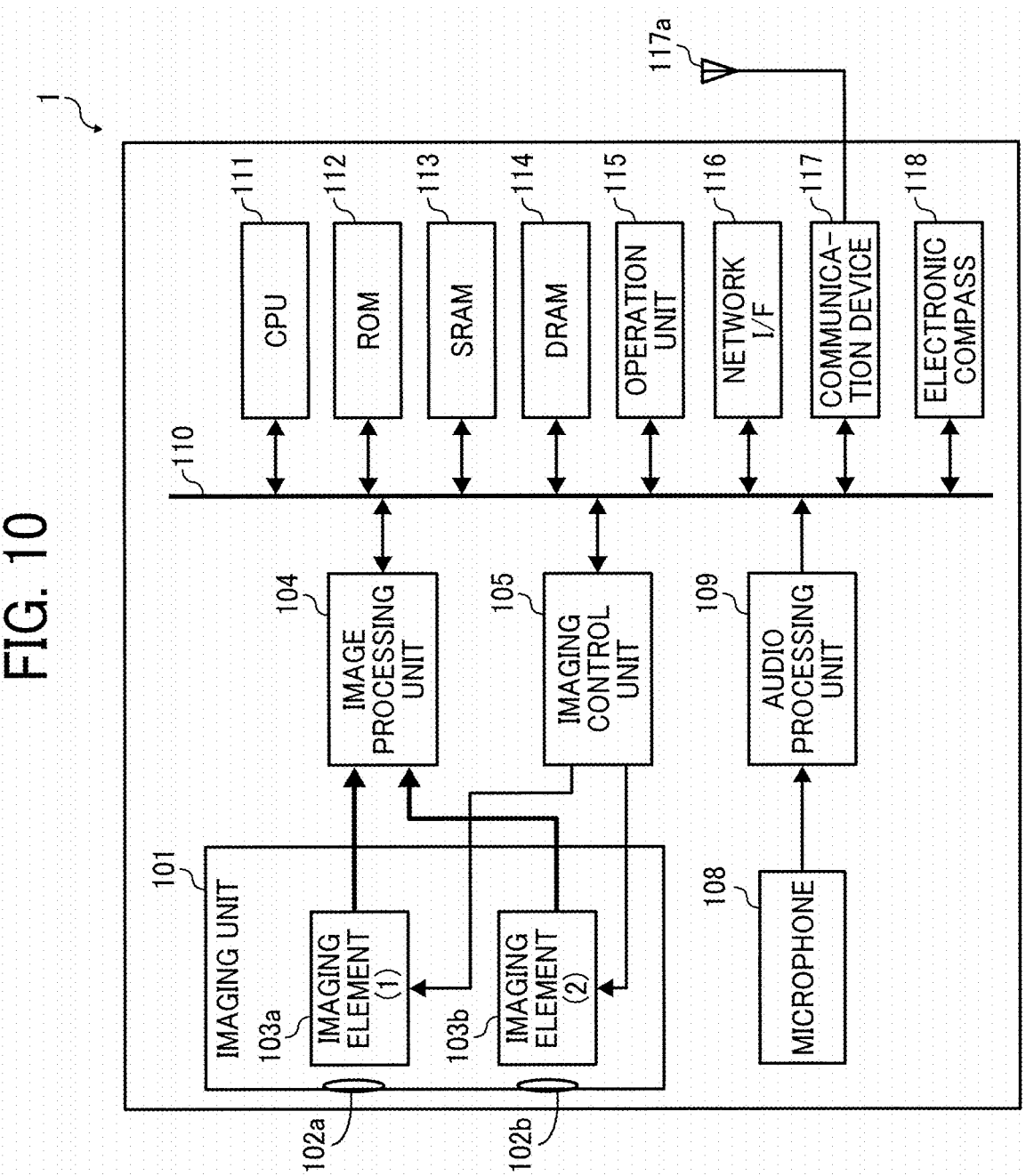
FIG. 10 is a block diagram illustrating a hardware configuration of the image capturing device, according to an embodiment of the present disclosure.

First, referring to FIG. 10, a hardware configuration of the image capturing device 1 is described according to the embodiment. FIG. 10 is a block diagram illustrating a hardware configuration of the image capturing device 1 according to the embodiment. The following describes a case in which the image capturing device 1 is a spherical (omnidirectional) image capturing device having two imaging elements. However, the image capturing device 1 can include any suitable number of imaging elements, providing that it includes at least two imaging elements. In addition, the image capturing device 1 is not necessarily an image capturing device dedicated to omnidirectional image capturing. In another example, an external omnidirectional image capturing unit can be attached to a general-purpose digital camera or a smartphone to implement an image capturing device having substantially the same function as that of the image capturing device 1.

As illustrated in FIG. 10, the image capturing device 1 includes an imaging unit 101, an image processing unit 104, an imaging control unit 105, a microphone 108, an audio processing unit 109, a central processing unit (CPU) 111, a read only memory (ROM) 112, a static random access memory (SRAM) 113, a dynamic random access memory (DRAM) 114, the operation unit 115, a network interface (UF) 116, a communication device 117, and an antenna 117a.

The imaging unit 101 includes two wide-angle lenses (so-called fisheye lenses) 102a and 102b, each having an angle of view of equal to or greater than 180 degrees so as to form a hemispherical image. The imaging unit 101 further includes the two imaging elements 103a and 103b corresponding to the wide-angle lenses 102a and 102b respectively. Each of the imaging elements 103a and 103b includes an imaging sensor such as a CMOS sensor and a charge-coupled device (CCD) sensor, a timing generation circuit, and a group of registers. The imaging sensor converts an optical image formed by the fisheye lenses 102a and 102b into electric signals to output image data. The timing generation circuit generates horizontal or vertical synchronization signals, pixel clocks and the like for the imaging sensor. Various commands, parameters and the like for operations of the imaging elements 103a and 103b are set in the group of registers.

Each of the imaging elements 103a and 103b of the imaging unit 101 is connected to the image processing unit 104 via a parallel I/F bus. In addition, each of the imaging elements 103a and 103b of the imaging unit 101 is connected to the imaging control unit 105 via a serial I/F bus such as an I2C bus. Each of the image processing unit 104 and the imaging control unit 105 is connected to the CPU 111 via a bus 110. Furthermore, the ROM 112, the SRAM 113, the DRAM 114, the operation unit 115, the network I/F 116, the communication device 117, and the electronic compass 118 are also connected to the bus 110.

The image processing unit 104 obtains image data from each of the imaging elements 103a and 103b via the parallel I/F bus and performs predetermined processing on the image data obtained from each of the imaging elements 103a and 103b separately. Thereafter, the image processing unit 104 combines these image data to generate data of the Mercator image as illustrated in FIG. 3C.

The imaging control unit 105 usually functions as a master device while each of the imaging elements 103a and 103b usually functions as a slave device. The imaging control unit 105 sets commands and the like in the group of registers of each of the imaging elements 103a and 103b via the I2C bus. The imaging control unit 105 receives necessary commands from the CPU 111. Further, the imaging control unit 105 obtains status data of the group of registers of each of the imaging elements 103a and 103b via the I2C bus. The imaging control unit 105 sends the obtained status data to the CPU 111.

The imaging control unit 105 instructs the imaging elements 103a and 103b to output the image data at a time when the shutter button of the operation unit 115 is pressed. The image capturing device 1 can support a preview display function (e.g., displaying a preview on a display such as a display of the videoconference terminal 3) or a movie display function. In case of displaying movie, image data are continuously output from the imaging elements 103a and 103b at a predetermined frame rate (frames per minute).

Furthermore, the imaging control unit 105 operates in cooperation with the CPU 111, to synchronize the time when the imaging element 103a outputs image data and the time when the imaging element 103b outputs the image data. In the present embodiment, the image capturing device 1 does not include a display unit (display). However, in another example, the image capturing device 1 can include a display.

The microphone 108 converts sound into audio data (signal). The audio processing unit 109 obtains audio data output from the microphone 108 via an I/F bus and performs predetermined processing on the audio data.

The CPU 111 controls entire operation of the image capturing device 1 and performs necessary processing. The ROM 112 stores various programs for execution by the CPU 111. Each of the SRAM 113 and the DRAM 114 operates as a work memory to store programs loaded from the ROM 112 for execution by the CPU 111 or data being currently processed. More specifically, in one example, the DRAM 114 stores image data currently processed by the image processing unit 104 and data of the Mercator image on which processing has been performed.

The operation unit 115 collectively refers to various operation keys, a power switch, the shutter button, and a touch panel having functions of both displaying information and receiving input from a user, which can be used in combination. A user operates the operation keys to input various image capturing (photographing) modes or image capturing (photographing) conditions.

The network I/F 116 collectively refers to an interface circuit such as a USB I/F that enables the image capturing device 1 to communicate data with an external medium such as a secure digital (SD) card or an external personal computer. The network I/F 116 supports at least one of wired and wireless communications. The data of the Mercator image, which is stored in the DRAM 114, can be stored in the external medium via the network I/F 116 or transmitted to extraneous sources such as the videoconference terminal 3 via the network I/F 116, as needed.

The communication device 117 communicates with extraneous sources such as the videoconference terminal 3 via the antenna 117a of the image capturing device 1 using a short-range wireless communication network such as Wi-Fi and Near Field Communication (NFC). The communication device 117 can also transmits the data of Mercator image to the extraneous sources such as the videoconference terminal 3.

The electronic compass 118 computes an orientation and a tilt (roll angle) of the image capturing device 1 based on the Earth's magnetism to output orientation and tilt information. This orientation and tilt information is an example of related information, which is metadata described in compliance with Exif. This information is used for image processing such as image correction on captured images. The related information also includes data indicating a time (date) when an image is captured by the image capturing device 1, and data indicating a size of image data, for example.

<Hardware Configuration of Videoconference Terminal 3>

Figure 11:
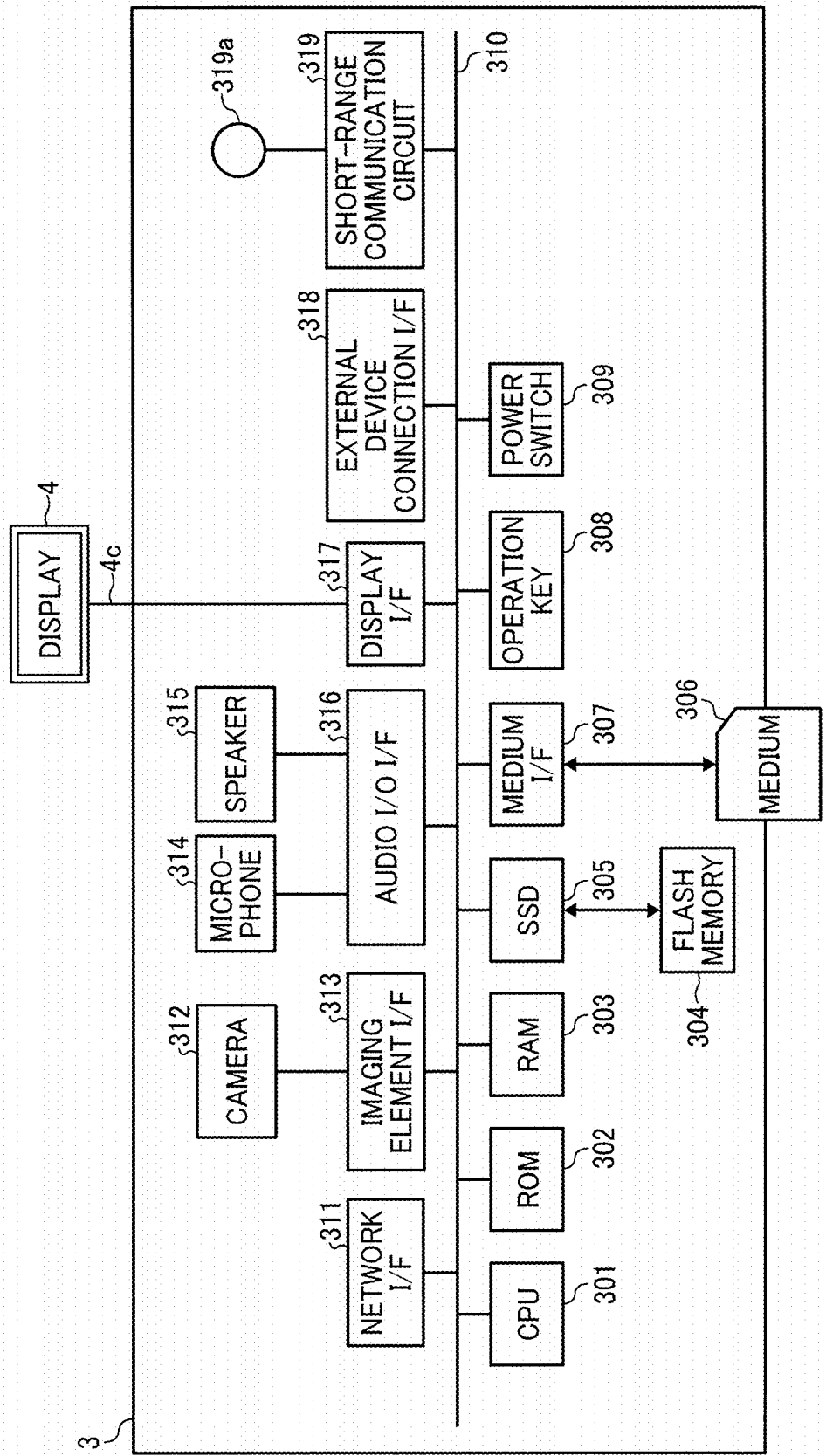
FIG. 11 is a block diagram illustrating a hardware configuration of a videoconference terminal, according to an embodiment of the present disclosure.

Next, referring to FIG. 11, a hardware configuration of the videoconference terminal 3 is described according to the embodiment. FIG. 11 is a block diagram illustrating a hardware configuration of the videoconference terminal 3 according to the embodiment. As illustrated in FIG. 11, the videoconference terminal 3 includes a CPU 301, a ROM 302, a RAM 303, a flash memory 304, a solid state drive (SSD) 305, a medium I/F 307, an operation key 308, a power switch 309, a bus line 310, a network I/F 311, a camera 312, an imaging element I/F 313, a microphone 314, a speaker 315, an audio input/output I/F 316, a display I/F 317, an external device connection I/F 318, a short-range communication circuit 319, and an antenna 319a for the short-range communication circuit 319.

The CPU 301 controls entire operation of the videoconference terminal 3. The ROM 302 stores a control program such as an Initial Program Loader (IPL) to boot the CPU 301. The RAM 303 is used as a work area for the CPU 301. The flash memory 304 stores various data such as a communication control program, image data, and audio data. The SSD 305 controls reading and writing of various data from and to the flash memory 304 under control of the CPU 301. In alternative to the SSD, a hard disc drive (HDD) can be used. The medium I/F 307 controls reading and writing (storing) of data from and to a storage medium 306 such as a flash memory. The operation key (keys) 308 is operated by a user to input a user instruction such as a user selection of a destination of communication from the videoconference terminal 3. The power switch 309 is a switch that turns on or off the power of the videoconference terminal 3.

The network I/F 311 in an interface that controls communication of data between the videoconference terminal 3 and extraneous sources through the communication network 100 such as the Internet. The camera 312 is an example of a built-in imaging device configured to capture a subject under control of the CPU 301 to obtain image data. The imaging element I/F 313 is a circuit that controls driving of the camera 312. The microphone 314 is an example of a built-in audio collecting device configured to input audio. The audio input/output I/F 316 is a circuit for controlling input and output of audio signals between the microphone 314 and the speaker 315 under control of the CPU 301. The display I/F 317 is a circuit for transmitting image data to the display 4, which is external to the videoconference terminal 3, under control of the CPU 301. The external device connection I/F 318 is an interface that connects the videoconference terminal 3 to various external devices. The short-range communication circuit 319 is a communication circuit in compliance with the NFC standard, Bluetooth (registered trademark) or the like.

The bus line 310 is an address bus, a data bus or the like, which electrically connects the elements illustrated in FIG. 11 such as the CPU 301.

The display 4 is an example of a display device that displays an image of a subject, an operation icon, etc. The display 4 is configured as a liquid crystal display or an organic electroluminescence (EL) display, for example. The display 4 is connected to the display I/F 317 by a cable 4c. For example, the cable 4c is an analog red green blue (RGB) (video graphic array (VGA)) signal cable, a component video cable, a high-definition multimedia interface (HDMI) (registered trademark) signal cable, or a digital video interactive (DVI) signal cable.

The camera 312 includes a lens and a solid-state imaging element that converts an image (video image) of subject to electronic data by photoelectric conversion. Examples of the solid-state imaging element include a CMOS sensor and a CCD sensor. The external device connection I/F 318 is configured to connect the videoconference terminal 3 to extraneous sources such as an external camera, an external microphone, or an external speaker through a USB cable or the like. When an external camera is connected, the external camera is driven in preference to the built-in camera 312 under control of the CPU 301. Similarly, when an external microphone is connected or an external speaker is connected, the external microphone or the external speaker is driven in preference to the built-in microphone 314 or the built-in speaker 315 under control of the CPU 301.

The storage medium 306 is removable from the videoconference terminal 3. In addition to or in alternative to the flash memory 304, any suitable nonvolatile memory, such as an electrically erasable and programmable ROM (EEPROM) can be used, provided that it reads or writes data under control of CPU 301.

<Hardware Configuration of Communication Management System 5 and PC 7>

Figure 12:
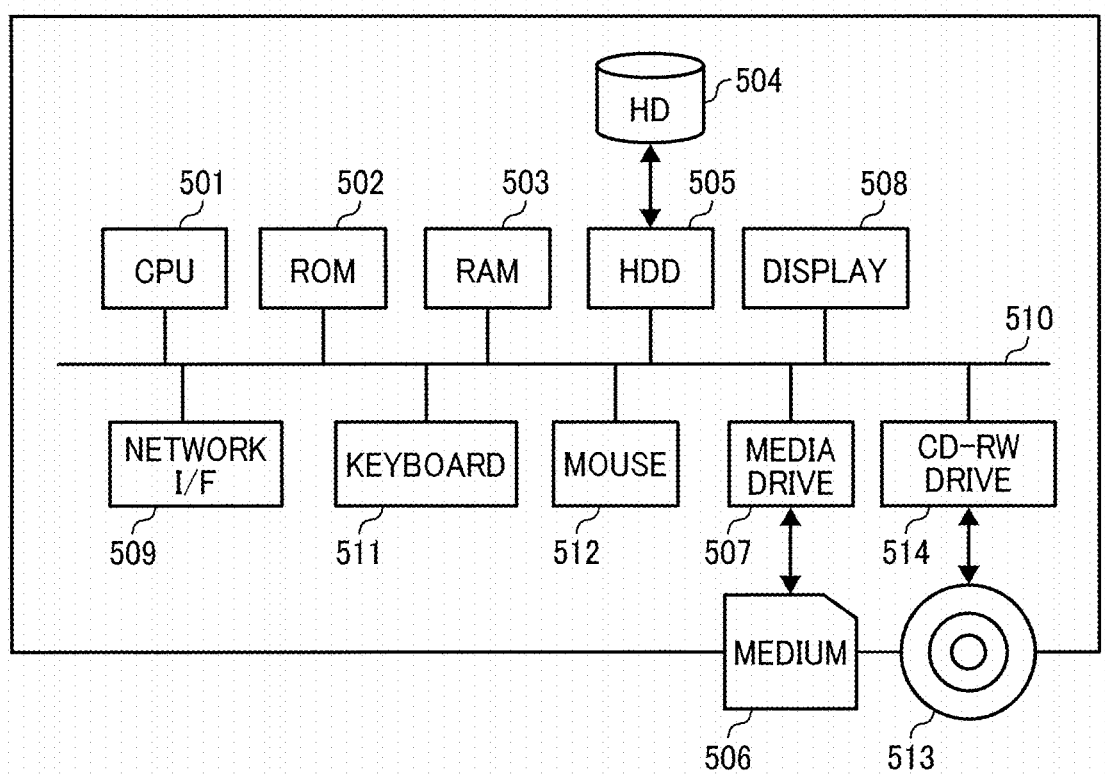
FIG. 12 is a block diagram illustrating a hardware configuration of any one of a communication management system and a personal computer (PC), according to an embodiment of the present disclosure.

Next, referring to FIG. 12, a hardware configuration of each of the communication management system 5 and the PC 7 is described, according to the embodiment. FIG. 12 is a block diagram illustrating an example of the hardware configuration of any one of the communication management system 5 and the PC 7. In the embodiment, the communication management system 5 and the PC 7 are individually implemented by a computer. Therefore, a description is given of a configuration of the communication management system 5, and the description of a configuration of the PC 7 is omitted, having the same or substantially the same configuration as that of the communication management system 5.

The communication management system 5 includes a CPU 501, a ROM 502, a RAM 503, a hard disc (HD) 504, an HDD 505, a media drive 507, a display 508, a network I/F 509, a keyboard 511, a mouse 512, a compact disc rewritable (CD-RW) drive 514, and a bus line 510. The CPU 501 controls entire operation of the communication management system 5. The ROM 502 stores a control program such as an IPL to boot the CPU 501. The RAM 503 is used as a work area for the CPU 501. The HD 504 stores various types of data, such as a control program for the communication management system 5. The HDD 505 controls reading and writing of various data from and to the HD 504 under control of the CPU 501. The media drive 507 controls reading and writing (storing) of data from and to a storage medium 506 such as a flash memory. The display 508 displays various information such as a cursor, menu, window, characters, or image. The network I/F 509 is an interface that controls communication of data between the communication management system 5 and extraneous sources through the communication network 100. The keyboard 511 includes a plurality of keys to allow a user to input characters, numerals, or various instructions. The mouse 512 allows a user to select a specific instruction or execution, select a target for processing, or move a cursor being displayed. The CD-RW drive 514 controls reading and writing of various data from and to a CD-RW 513, which is one example of a removable storage medium. The bus line 510 is an address bus, a data bus or the like, which electrically connects the above-described hardware elements, as illustrated in FIG. 12.

<Hardware Configuration of Smartphone 9>

Referring to FIG. 13, a hardware configuration of the smartphone 9 is described, according to the embodiment. FIG. 13 is a block diagram illustrating a hardware configuration of the smartphone 9, according to the embodiment. As illustrated in FIG. 13, the smartphone 9 includes a CPU 901, a ROM 902, a RAM 903, an EEPROM 904, a CMOS sensor 905, an acceleration and orientation sensor 906, a medium I/F 908, and a global positioning system (GPS) receiver 909.

The CPU 901 controls entire operation of the smartphone 9. The ROM 902 stores a control program such as an IPL to boot the CPU 901. The RAM 903 is used as a work area for the CPU 901. The EEPROM 904 reads or writes various data such as a control program for a smartphone under control of the CPU 901. The CMOS sensor 905 captures an object (mainly, a self-image of a user operating the smartphone 9) under control of the CPU 901 to obtain image data. The acceleration and orientation sensor 906 includes various sensors such as an electromagnetic compass for detecting geomagnetism, a gyrocompass, and an acceleration sensor. The medium I/F 908 controls reading and writing of data from and to a storage medium 907 such as a flash memory. The GPS receiver 909 receives GPS signals from a GPS satellite.

The smartphone 9 further includes a long-range communication circuit 911, a camera 912, an imaging element I/F 913, a microphone 914, a speaker 915, an audio input/output I/F 916, a display 917, an external device connection I/F 918, a short-range communication circuit 919, an antenna 919a for the short-range communication circuit 919, and a touch panel 921.

The long-range communication circuit 911 is a circuit that enables the smartphone 9 to communicate with other device through the communication network 100. The camera 912 is an example of a built-in imaging device configured to capture a subject under control of the CPU 901 to obtain image data. The imaging element I/F 913 is a circuit that controls driving of the camera 912. The microphone 914 is an example of a built-in audio collecting device configured to input audio. The audio input/output I/F 916 is a circuit for controlling input and output of audio signals between the microphone 914 and the speaker 915 under control of the CPU 901. The display 917 is an example of a display device that displays an image of a subject, various icons, etc. The display 917 is configured as a liquid crystal display or an organic EL display, for example. The external device connection I/F 918 is an interface that connects the smartphone 9 to various external devices. The short-range communication circuit 919 is a communication circuit in compliance with the NFC standard, Bluetooth (registered trademark) or the like. The touch panel 921 is an example of an input device that enables a user to operate the smartphone 9 by touching a screen of the display 917.

The smartphone 9 further includes a bus line 910. The bus line 910 is an address bus, a data bus or the like, which electrically connects the elements in FIG. 13 such as the CPU 901.

In addition, a storage medium such as a CD-ROM storing any of the above-described programs and/or an HD storing any of the above-described programs can be distributed domestically or overseas as a program product.

Functional Configuration of Embodiment

Referring to FIGS. 14 to 20, a functional configuration of the image communication system is described according to the present embodiment. FIGS. 14A and 14B are a schematic functional block diagram illustrating functional configurations of the image capturing device 1a, the image capturing device 1b, the videoconference terminal 3, the communication management system 5, the PC 7 and the smartphone 9, which constitute a part of the image communication system, according to the embodiment.

<Functional Configuration of Image Capturing Device 1a>

Figure 14A:
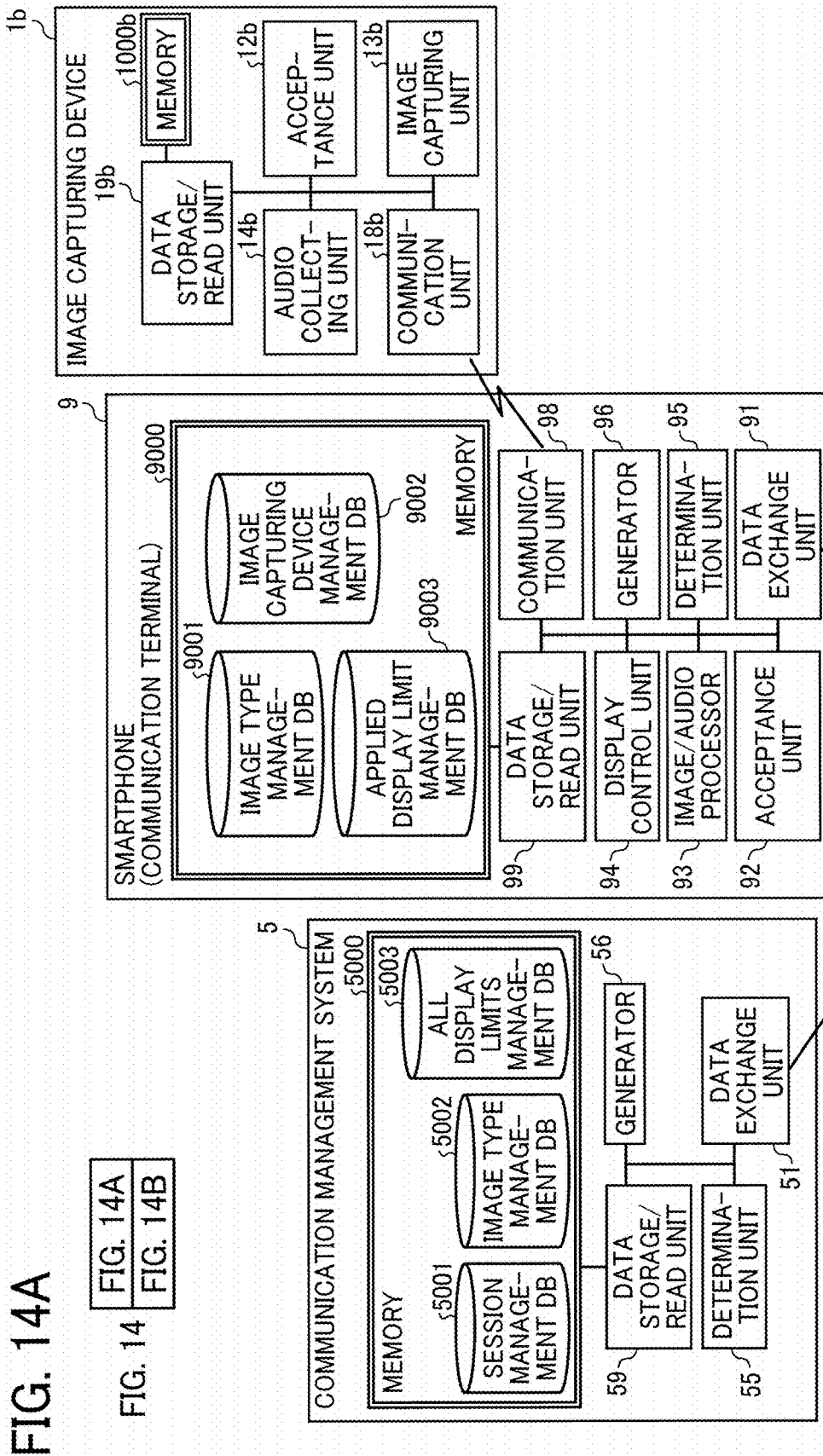
FIGS. 14A and 14B are a block diagram illustrating a functional configuration of the image communication system, according to an embodiment of the present disclosure.
Figure 14B:
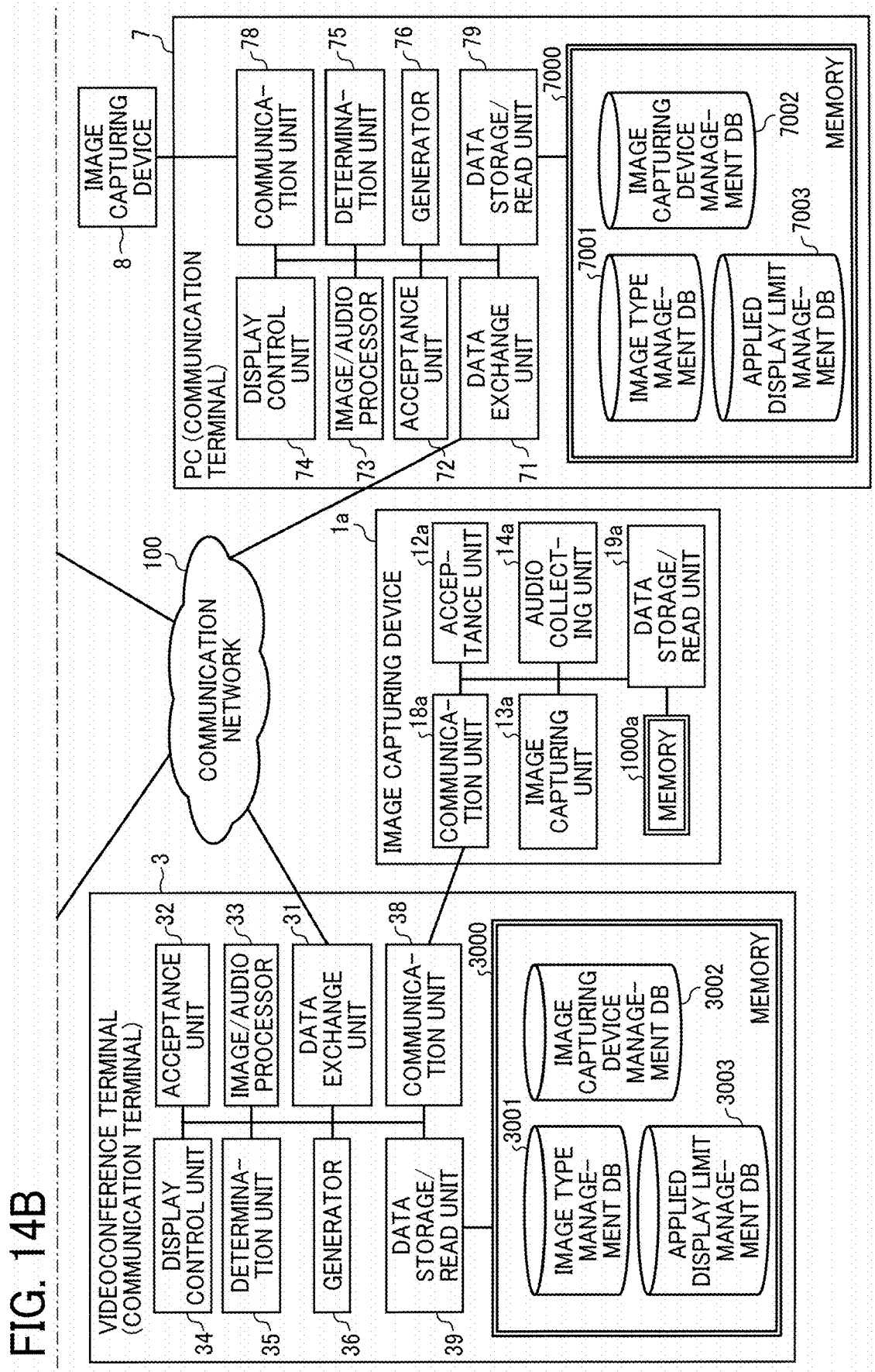

As illustrated in FIG. 14B, the image capturing device 1a includes, for example, an acceptance unit 12a, an image capturing unit 13a, an audio collecting unit 14a, a communication unit 18a, and a data storage/read unit 19a. Each of the above-mentioned units is a function or means that is implemented by or that is caused to function by operating any one or more of the hardware elements illustrated in FIG. 10 in cooperation with instructions from the CPU 111 according to a control program for the image capturing device 1a, expanded from the SRAM 113 to the DRAM 114.

The image capturing device 1a further includes a memory 1000a, which is implemented by the ROM 112, the SRAM 113, and the DRAM 114 illustrated in FIG. 10. The memory 1000a stores therein a globally unique identifier (GUID) identifying the own device (i.e., the image capturing device 1a itself).

Each Functional Unit of Image Capturing Device 1a:

Referring to FIG. 10 and FIG. 14B, each of the functional units of the image capturing device 1a is described in detail.

The acceptance unit 12a of the image capturing device 1a is mainly implemented by the operation unit 115 illustrated in FIG. 10, which operates under control of the CPU 111. The acceptance unit 12a receives an instruction input from the operation unit 115 according to a user operation.

The image capturing unit 13a is implemented mainly by the imaging unit 101, the image processing unit 104, and the imaging control unit 105, illustrated in FIG. 10, each of which operates under control of the CPU 111. The image capturing unit 13 captures an image of an object or surroundings to obtain captured-image data.

The audio collecting unit 14a is mainly implemented by the microphone 108 and the audio processing unit 109 illustrated in FIG. 10, each of which operates under control of the CPU 111. The audio collecting unit 14a collects sounds around the image capturing device 1a.

The communication unit 18a, which is mainly implemented by instructions of the CPU 111, communicates data with a communication unit 38 of the videoconference terminal 3 using a short-range wireless communication network in compliance with the NFC standard, Bluetooth (registered trademark), or Wi-Fi, for example.

The data storage/read unit 19a, which is mainly implemented by instructions of the CPU 111 illustrated in FIG. 10, stores various data or information in the memory 1000a and reads out various data or information from the memory 1000a.

Each Functional Unit of Image Capturing Device 1b:

The image capturing device 1b includes an acceptance unit 12b, an image capturing unit 13b, an audio collecting unit 14*b*, a communication unit 18*b*, and a data storage/read unit 19*b*. These functional units of the image capturing device 1*b* implement the similar or substantially the similar functions as those of the acceptance unit 12*a*, the image capturing unit 13*a*, the audio collecting unit 14*a*, the communication unit 18*a*, and the data storage/read unit 19*a* of the image capturing device 1*a*, respectively. Therefore, redundant descriptions thereof are omitted below. The image capturing device 1*b* further includes a memory 1000*b*, which is implemented by the ROM 112, the SRAM 113, and the DRAM 114 illustrated in FIG. 10. The memory 1000*b* stores therein a GUID identifying the own device (i.e., the image capturing device 1*b* itself).

<Functional Configuration of Videoconference Terminal 3>

As illustrated in FIG. 14B, the videoconference terminal 3 includes a data exchange unit 31, an acceptance unit 32, an image/audio processor 33, a display control unit 34, a determination unit 35, a generator 36, a communication unit 38, and a data storage/read unit 39. Each of the above-mentioned units is a function or means that is implemented by or that is caused to function by operating any one or more of the hardware elements illustrated in FIG. 11 in cooperation with instructions from the CPU 301 according to a control program for the videoconference terminal 3, expanded from the flash memory 304 to the RAM 303.

The videoconference terminal 3 further includes a memory 3000, which is implemented by the ROM 302, the RAM 303, and the flash memory 304 illustrated in FIG. 11. The memory 3000 includes an image type management database (DB) 3001, an image capturing device management DB 3002, and an applied display limit management DB 3003. Among these DBs, the image type management DB 3001 is configured as an image type management table as illustrated in FIG. 15. The image capturing device management DB 3002 is configured as an image capturing device management table as illustrated in FIG. 16. The applied display limit management DB 3003 is configured as an applied display limit management table as illustrated in FIG. 17.

Image Type Management Table:

FIG. 15 is an illustration of an example data structure of the image type management table. The image type management table stores an image data identifier (ID), an internet protocol (IP) address, which is an example of an address of a terminal as a transmission source of image data, and a source name, in association with one another. The terminal as a transmission source is hereinafter referred to as a "sender terminal". The image data ID is one example of image data identification information identifying image data to be used in video communication. The same image data ID is assigned to image data transmitted from the same sender terminal. By using the image data ID, a destination terminal (that is, a communication terminal that receives image data) identifies a sender terminal from which the received image data is transmitted. An IP address of the sender terminal, which is associated with a specific image data ID, is an IP address of a communication terminal that transmits image data identified by that image data ID associated with the IP address. A source name, which is associated with a specific image data ID, is a name for specifying an image capturing device that outputs the image data identified by that image data ID associated with the source name. The source name is one example of image type information. The source name is a name generated by a communication terminal such as the videoconference terminal 3 according to a predetermined naming rule.

The example of the image type management table illustrated in FIG. 15 indicates that three communication terminals, whose IP addresses are respectively "1.2.1.3", "1.2.2.3", and "1.3.1.3" transmit image data identified by the image data ID "RS001", "RS002", and "RS003", respectively. Further, according to the image type management table illustrated in FIG. 15, the image types represented by the source names of those three communication terminals are "Video_Theta", "Video", and "Video_Theta", that indicate the image types, which are "special image", "general image", and "special image", respectively. In the embodiment, the "special image" is a spherical panoramic image.

In another example, data other than the image data are stored in the image type management table in association with the image data ID. Examples of the data other than the image data include audio data and presentation material data to be shared on a screen.

Image Capturing Device Management Table:

FIG. 16 is an illustration of an example data structure of the image capturing device management table. The image capturing device management table stores a vendor ID and a product ID among the GUIDs of an image capturing device that is configured to obtain two hemispherical images, from which a spherical panoramic image is generated. As the GUID, a combination of a vendor ID (VID) and a product ID (PID) used in a USB device is used, for example. The vendor ID and the product ID are stored in a communication terminal such as a videoconference terminal before shipment. In another example, these IDs are added and stored in the communication terminal after shipment.

Applied Display Limit Management Table:

FIG. 17 is an illustration of an example data structure of the applied display limit management table. The applied display limit management table stores a display control parameter, such as display restriction parameter, for each of IP addresses of the communication terminals, each being a sender terminal of image data of two hemispherical images, from which a spherical panoramic image is generated. The display control parameter indicates a content of a limit placed on a predetermined-area image to be displayed by the own terminal (the videoconference terminal 3). This display control parameter is the same as a display control parameter stored in an all display limits management table, which is described later.

Each Functional Unit of Videoconference Terminal 3:

Referring to FIG. 11 and FIG. 14B, each of the functional units of the videoconference terminal 3 is described in detail.

The data exchange unit 31 of the videoconference terminal 3 is mainly implemented by the network I/F 311 illustrated in FIG. 11, which operates under control of the CPU 301. The data exchange unit 31 exchanges various data or information with communication management system 5 via the communication network 100.

The acceptance unit 32 is mainly implemented by the operation key 308, which operates under control of the CPU 301. The acceptance unit 32 receives selections or inputs according to a user operation. In another example, an input device such as a touch panel is used in addition to or in place of the operation key 308.

The image/audio processor 33, which is implemented by instructions of the CPU 301 illustrated in FIG. 11, processes image data obtained by capturing a subject by the camera 312. After voice sound generated by a user is converted to audio signals by the microphone 314, the image/audio processor 33 performs processing on audio data corresponding to the audio signals.

Further, the image/audio processor 33 processes image data received from another communication terminal based on the image type information such as the source name. The display control unit 34 causes the display 4 to display an image based on the processed image data. More specifically, when the image type information indicates "special image", the image/audio processor 33 converts the image data such as hemispherical image data as illustrated in FIG. 3A and FIG. 3B into spherical panoramic image data to generate a spherical panoramic image as illustrated in FIG. 4B. Further, the image/audio processor 33 generates a predetermined-area image as illustrated in FIG. 6B. Furthermore, the image/audio processor 33 outputs, to the speaker 315, audio signals according to audio data received from another communication terminal via the communication management system 5. The speaker 315 outputs sound based on the audio signal.

The display control unit 34 is mainly implemented by the display I/F 317, which operates under control of the CPU 301. The display control unit 34 causes the display 4 to display various images or characters.

The determination unit 35, which is mainly implemented by instructions of the CPU 301, determines an image type corresponding to image data received from, for example, the image capturing device 1a.

The generator 36 is mainly implemented by instructions of the CPU 301. The generator 36 generates a source name, which is one example of the image type information, according to the above-described naming rule, based on a determination result obtained by the determination unit 35 indicating one of a general image and a special image (the "special image" is a spherical panoramic image, in the embodiment). For example, when the determination unit 35 determines that the image type is a general image, the generator 36 generates a source name of "Video" that indicates a general image type. By contrast, when the determination unit 35 determines that the image type is a special image, the generator 36 generates a source name of "Video_Theta" that indicates a special image type.

The communication unit 38 is mainly implemented by the short-range communication circuit 319 and the antenna 319a, each of which operates under control of the CPU 301. The communication unit 38 communicates with the communication unit 18a of the image capturing device 1a using the short-range wireless communication network in compliance with the NFC standard, Bluetooth (registered trademark), or Wi-Fi, for example. In the above description, the communication unit 38 and the data exchange unit 31 individually have a communication unit. In another example, the communication unit 38 and the data exchange unit 31 share a single communication unit.

The data storage/read unit 39, which is mainly implemented by instructions of the CPU 301 illustrated in FIG. 11, stores various data or information in the memory 3000 and reads out various data or information from the memory 3000.

<Functional Configuration of Communication Management System 5>

Referring to FIG. 12 and FIG. 14A, each of the functional units of the communication management system 5 is described in detail. The communication management system 5 includes a data exchange unit 51, a determination unit 55, a generator 56, and a data storage/read unit 59. Each of the above-mentioned units is a function or means that is implemented by or that is caused to function by operating any one or more of the hardware elements illustrated in FIG. 12 in cooperation with instructions from the CPU 501 according to a control program for the communication management system 5, expanded from the HD 504 to the RAM 503.

The communication management system 5 further includes a memory 5000, which is implemented by the RAM 503 and the HD 504 illustrated in FIG. 12. The memory 5000 includes a session management DB 5001, an image type management DB 5002, and an all display limits management DB 5003. The session management DB 5001 is configured as a session management table as illustrated in FIG. 18. The image type management DB 5002 is configured as an image type management table as illustrated in FIG. 15. The all display limits management DB 5003 is configured as an all display limits management table as illustrated in FIG. 20.

Session Management Table:

FIG. 18 is an illustration of an example data structure of the session management table. The session management table stores a session ID and an IP address of a participant communication terminal, in association with each other. The session ID is one example of session identification information for identifying a session that implements video communication. Each session ID is generated for a corresponding virtual conference room. The one or more session IDs are also stored and managed in each communication terminal, such as the videoconference terminal 3, to be used by each communication terminal to select a communication session. The 12 address of the participant communication terminal indicates an IP address of each of the communication terminal(s) participating in a virtual conference room identified by an associated session ID.

Image Type Management Table:

FIG. 19 is an illustration of an example data structure of the image type management table. The image type management table illustrated in FIG. 19 stores, in addition to the information items stored in the image type management table illustrated in FIG. 15, the same session IDs as those stored in the session management table, in association with one another. The example of the image type management table illustrated in FIG. 19 indicates that three communication terminals whose IP addresses are "1.2.1.3", "1.2.2.3", and "1.3.1.3" are participating in the virtual conference room identified by the session ID "se101". The communication management system 5 stores the same image data ID, IP address of the sender terminal, and image type information as those stored in a communication terminal, such as the videoconference terminal 3. This enables the communication management system 5 to transmit the image type information, etc., to a communication terminal that is currently participating in video communication and another communication terminal that newly participates in the video communication by entering a virtual conference room of the video communication. Accordingly, the communication terminal that is already in the video communication and the communication terminal that is newly participates in the video communication do not have to such information including the image type information.

All Display Limits Management Table:

FIG. 20 is an illustration of an example data structure of the all display limits management table. The all display limits management table stores, for each of the IP addresses of the communication terminals, each being a sender terminal of image data of two hemispherical images from which a spherical panoramic image is generated, a display control parameter indicating a content of a limit placed on a display of a predetermined-area image applied by the corresponding communication terminal. Using the all display limits management table, the communication management system 5 manages limits applied by a sender terminal of image data to a destination terminal of the image data.

Each Functional Unit of Communication Management System 5:

Referring to FIG. 12 and FIG. 14A, each of the functional units of the communication management system 5 is described in detail.

The data exchange unit 51 of the communication management system 5 is mainly implemented by the network I/F 509, which operates under control of the CPU 501 illustrated in FIG. 12. The data exchange unit 51 exchanges various data or information with the videoconference terminal 3 or the PC 7 through the communication network 100.

The determination unit 55, which is mainly implemented by operation of the CPU 501, performs various determinations.

The generator 56, which is mainly implemented by instructions of the CPU 501, generates an image data ID.

The data storage/read unit 59 is mainly implemented by the HDD 505 illustrated in FIG. 12, which operates under control of the CPU 501. The data storage/read unit 59 stores various data or information in the memory 5000 and reads out various data or information from the memory 5000.

<Functional Configuration of PC 7>

Referring to FIG. 12 and FIG. 14B, a functional configuration of the PC 7 is described according to the embodiment. The PC 7 has substantially the same functions as those of the videoconference terminal 3. In other words, as illustrated in FIG. 14B, the PC 7 includes a data exchange unit 71, an acceptance unit 72, an image/audio processor 73, a display control unit 74, a determination unit 75, a generator 76, a communication unit 78, and a data storage/read unit 79. Each of the above-mentioned units is a function or means that is implemented by or that is caused to function by operating any one or more of the hardware elements illustrated in FIG. 12 in cooperation with instructions from the CPU 501 according to a control program for the PC 7, expanded from the HD 504 to the RAM 503.

The PC 7 further includes a memory 7000, which is implemented by the ROM 502, the RAM 503 and the HD 504 illustrated in FIG. 12. The memory 7000 includes an image type management DB 7001, an image capturing device management DB 7002, and an applied display limit management DB 7003. The image type management DB 7001, the image capturing device management DB 7002, and the applied display limit management DB 7003 have substantially the same data structure as the image type management DB 3001, the image capturing device management DB 3002, and the applied display limit management DB 3003, respectively, and redundant descriptions thereof are omitted below.

Each functional Unit of PC 7:

The data exchange unit 71 of the PC 7 is mainly implemented by the network I/F 509, which operates under control of the CPU 501 illustrated in FIG. 12. The data exchange unit 71 implements the similar or substantially the similar function to that of the data exchange unit 31.

The acceptance unit 72 is mainly implemented by the keyboard 511 and the mouse 512, which operates under control of the CPU 501. The acceptance unit 72 implements the similar or substantially the similar function to that of the acceptance unit 32. The image/audio processor 73, which is mainly implemented by instructions of the CPU 501, implements the similar or substantially the similar function to that of the image/audio processor 33. The display control unit 74, which is mainly implemented by instructions of the CPU 501, implements the similar or substantially the similar function to that of the display control unit 34. The determination unit 75, which is mainly implemented by instructions of the CPU 501, implements the similar or substantially the similar function to that of the determination unit 35. The generator 76, which is mainly implemented by instructions of the CPU 501, implements the similar or substantially the similar function to that of the generator 36. The communication unit 78, which is mainly implemented by instructions of the CPU 501, implements the similar or substantially the similar function to that of the communication unit 38. The data storage/read unit 79, which is mainly implemented by instructions of the CPU 501, stores various data or information in the memory 7000 and reads out various data or information from the memory 7000.

<Functional Configuration of Smartphone 9>

Referring to FIG. 13 and FIG. 14A, a functional configuration of the smartphone 9 is described, according to the embodiment. The smartphone 9 has substantially the same functions as the videoconference terminal 3. In other words, as illustrated in FIG. 14A, the smartphone 9 includes a data exchange unit 91, an acceptance unit 92, an image/audio processor 93, a display control unit 94, a determination unit 95, a generator 96, a communication unit 98, and a data storage/read unit 99. Each of the above-mentioned units is a function or means that is implemented by or that is caused to function by operating any one or more of the hardware elements illustrated in FIG. 13 in cooperation with instructions from the CPU 901 according to a control program for the smartphone 9, expanded from the EEPROM 904 to the RAM 903.

The smartphone 9 further includes a memory 9000, which is implemented by the ROM 902, the RAM 903, and the EEPROM 904 illustrated in FIG. 13. The memory 9000 includes an image type management DB 9001, an image capturing device management DB 9002, and an applied display limit management DB 9003. The image type management DB 9001, the image capturing device management DB 9002, and the applied display limit management DB 9003 have substantially the same data structure as the image type management DB 3001, the image capturing device management DB 3002, and the applied display limit management DB 3003, respectively, and the redundant descriptions thereof are omitted below.

Each Functional Unit of Smartphone 9:

The data exchange unit 91 of the smartphone 9 is mainly implemented by the long-range communication circuit 911 illustrated in the FIG. 13, which operates under control of the CPU 901. The data exchange unit 91 implements the similar or substantially the similar function to that of the data exchange unit 31.

The acceptance unit 92 is mainly implemented by the touch panel 921, which operates under control of the CPU 901. The acceptance unit 92 implements the similar or substantially the similar function to that of the acceptance unit 32.

The image/audio processor 93, which is mainly implemented by instructions of the CPU 901, implements the similar or substantially the similar function to that of the image/audio processor 33.

The display control unit 94, which is mainly implemented by instructions of the CPU 901, implements the similar or substantially the similar function to that of the display control unit 34.

The determination unit 95, which is mainly implemented by instructions of the CPU 901, implements the similar or substantially the similar function to that of the determination unit 35.

The generator 96, which is mainly implemented by instructions of the CPU 901, implements the similar or substantially the similar function to that of the generator 36.

The communication unit 98, which is mainly implemented by instructions of the CPU 901, implements the similar or substantially the similar function to that of the communication unit 38.

The data storage/read unit 99, which is implemented by instructions of the CPU 901, stores various data or information in the memory 9000 and reads out various data or information from the memory 9000.

Operation or Processes of Embodiment

<Participation Process>

Figure 21:
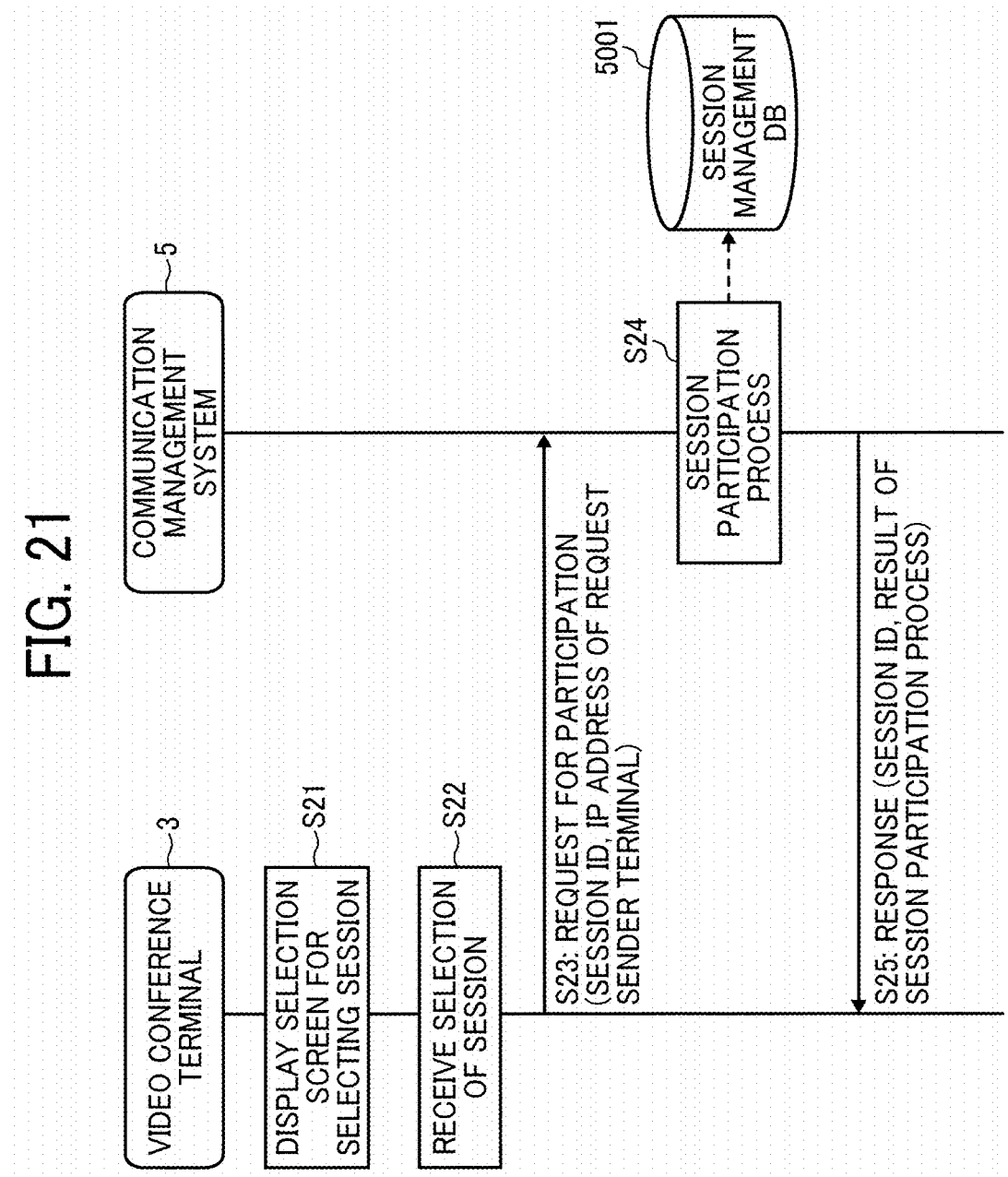
FIG. 21 is a sequence diagram illustrating an operation of participating in a specific communication session, according to an embodiment of the present disclosure.
Figure 22:
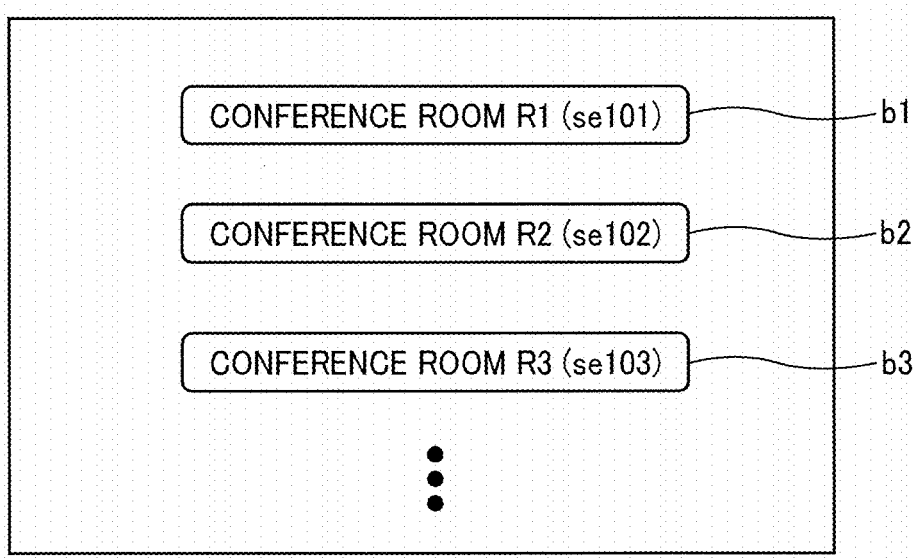
FIG. 22 is an illustration of a session selection screen for selecting a communication session (virtual conference room), according to an embodiment of the present disclosure.

Referring to FIG. 21 to FIG. 26, a description is given of an operation or processes according to the present embodiment. Referring to FIG. 21 and FIG. 22, an operation of participating in a specific communication session is described, according to the embodiment. FIG. 21 is a sequence diagram illustrating an operation of participating in a specific communication session, according to the embodiment. FIG. 22 is an illustration of a session selection screen for selecting a communication session (virtual conference room), according to the embodiment.

Figure 23:
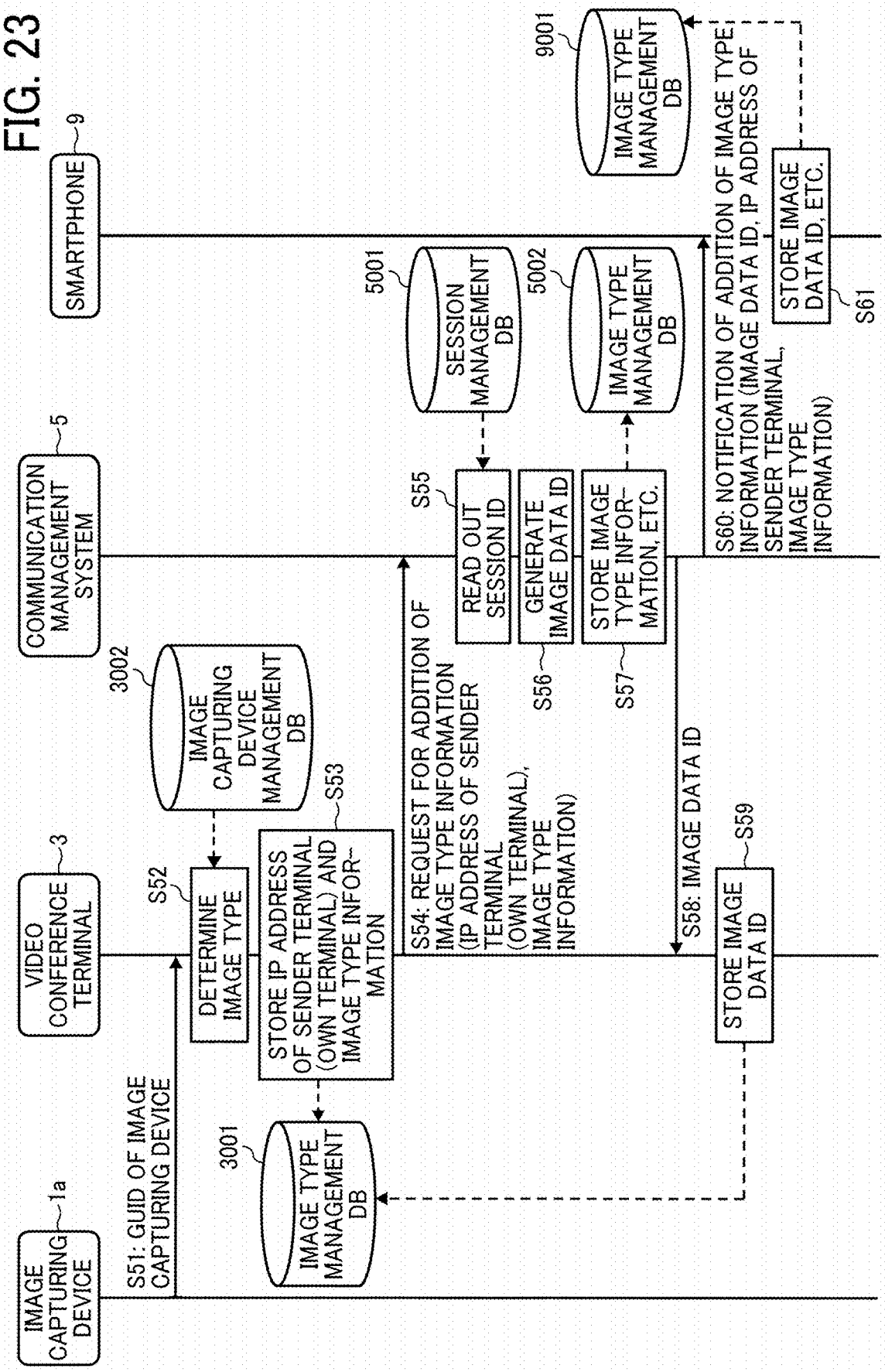
FIG. 23 is a sequence diagram illustrating an operation of managing image type information, according to an embodiment of the present disclosure.

When a user in the site A (e.g., user A1) operates the videoconference terminal 3 to display the session selection screen for selecting a communication session (virtual conference room), the acceptance unit 32 receives the operation to display the session selection screen, and the display control unit 34 causes the display 4 to display the session selection screen as illustrated in FIG. 23 (step S21). In the session selection screen, selection buttons b1, b2, and b3 are displayed. The selection buttons b1, b2, and b3 respectively indicates virtual conference rooms R1, R2, R3, each of which is a selection target. Each of the selection buttons b1, b2, and b3 is associated with a corresponding session ID.

When the user A1 selects a desired selection button (in this example, the selection button b1) on the session selection screen, the acceptance unit 32 receives selection of a corresponding communication session (step S22). Then, the data exchange unit 31 transmits a request to participate in the communication session, namely to enter the corresponding virtual conference room, to the communication management system 5 (step S23). This participation request includes a session ID identifying the communication session for which the selection is received at step S22, and the IP address of the videoconference terminal 3, which is a request sender terminal. The communication management system 5 receives the participation request at the data exchange unit 51.

Next, the data storage/read unit 59 performs a process for causing the videoconference terminal 3 to participate in the communication session (step S24). More specifically, the data storage/read unit 59 adds, in the session management DB 5001 (FIG. 18), the IP address that is received at step S23 to a field of the participant terminal IP address in a record of the session ID that is the same as the session ID received at step S23. The data exchange unit 51 transmits a response to the participation request to the videoconference terminal 3 (step S25). This response to the participation request includes the session ID that is received in step S23, and a result of the participation process. The videoconference terminal 3 receives the response to the participation request at the data exchange unit 31. The following describes a case where the operation for causing the videoconference terminal 3 to participate in the communication session, namely the participation process, is successfully completed.

<Operation of Managing Image Type Information>

Next, referring to FIG. 23, an operation of managing the image type information is described, according to the embodiment. FIG. 23 is a sequence diagram illustrating an operation of managing the image type information, according to the embodiment.

When a user (e.g., the user A1) in the site A connects the cradle 2a, on which the image capturing device 1a is mounted, to the videoconference terminal 3, using a wired cable such as a USB cable, the data storage/read unit 19a of the image capturing device 1a reads out the GUID of the own device (e.g., the image capturing device 1a) from the memory 1000a. Then, the communication unit 18a transmits the own device's GUID to the communication unit 38 of the videoconference terminal 3 (step S51). The videoconference terminal 3 receives the GUID of the image capturing device 1a at the communication unit 38.

Subsequently, the determination unit 35 of the videoconference terminal 3 determines whether a vendor ID and a product ID same as the GUID received in step S51 are stored in the image capturing device management DB 3002 (see FIG. 16) to determine the image type (step S52). More specifically, the determination unit 35 determines that the image capturing device 1a is an image capturing device that captures a special image (a spherical panoramic image, in the embodiment), based on determination that the same vender ID and product ID are stored in the image capturing device management DB 3002. By contrast, the determination unit 35 determines that the image capturing device 1a is an image capturing device that captures a general image, based on determination that the same vender ID and product ID are not stored in the image capturing device management DB 3002.

Next, the data storage/read unit 39 stores, in the image type management DB 3001 (FIG. 15), the IP address of the own terminal (i.e., videoconference terminal 3), which is a sender terminal, in association with the image type information, which is a determination result determined in step S52 (step S53). In this state, any image data ID is not yet associated. Examples of the image type information include a source name, which is determined according to the naming rule, and an image type (general image or special image).

Then, the data exchange unit 31 transmits a request for addition of the image type information to the communication management system 5 (step S54). This request for addition of image type information includes the IP address of the own terminal (videoconference terminal 3) as a sender terminal, and the image type information, both being stored in step S53 in association with each other. The communication management system 5 receives the request for addition of the image type information at the data exchange unit 51.

Next, the data storage/read unit 59 of the communication management system 5 searches the session management DB 5001 (FIG. 18) using the IP address of the sender terminal received in step S54 as a search key, to read out the session ID associated with the IP address (step S55).

Next, the generator 56 generates a unique image data ID (step S56). Then, the data storage/read unit 59 adds, in the image type management DB 5002 (FIG. 19), a new record associating the session ID that is read out in step S55, the image data ID generated in step S56, the IP address of the sender terminal and the image type information that are received in step S54, with one another (step S57). The data exchange unit 51 transmits the image data ID generated in step S56 to the videoconference terminal 3. The videoconference terminal 3 receives the image data ID at the data exchange unit 31 (step S58).

Next, the data storage/read unit 39 of the videoconference terminal 3 stores, in the image type management DB 3001 (FIG. 15), the image data ID received in step S58, in association with the IP address of the own terminal (i.e., videoconference terminal 3) as the sender terminal and the image type information that are stored in step S53 (step S59).

Further, the data exchange unit 51 of the communication management system 5 transmits a notification indicating addition of the image type information to the smartphone 9, which is another communication terminal (step S60). This notification indicating addition of the image type information includes the image data ID generated in step S56, and the IP address of the own terminal (i.e., videoconference terminal 3) as the sender terminal and the image type information that are stored in step S53. The smartphone 9 receives the notification indicating addition of the image type information at the data exchange unit 91. The destination of the notification transmitted by the data exchange unit 51 is indicated by an IP address associated with the session ID with which the IP address of the videoconference terminal 3 is associated in the session management DB 5001 (FIG. 18). In other words, the destination includes other communication terminal(s) that is (are) in the same virtual conference room where the videoconference terminal 3 is participating.

Next, the data storage/read unit 99 of the smartphone 9 adds, in the image type management DB 9001 (FIG. 15), a new record associating the image data ID, the IP address of the sender terminal, and the image type information, which are received in step S60 (step S61). In substantially the same manner, the notification indicating addition of the image type information is transmitted to the PC 7, which is one of the other communication terminals, and then the PC 7 stores the image type information, etc. in the image type management DB 7001 (FIG. 15). Through the operation as described above, the same information is shared among the communication terminals by being stored in the image type management DB 3001, the image type management DB 7001 and the image type management DB 9001.

<Operation of Communicating Image Data>

Next, referring to FIG. 24 to FIG. 27, an operation of communicating image data in video communication is described according to the embodiment. FIG. 24 is a sequence diagram illustrating an operation of transmitting image data in video communication according to the embodiment.

First, the communication unit 18a of the image capturing device 1a transmits image data obtained by capturing a subject or surrounding to the communication unit 38 of the videoconference terminal 3 (step S71). Because the image capturing device 1a is a device that is configured to obtain two hemispherical images, from which a spherical panoramic image is generated, the image data is configured by data of the two hemispherical images as illustrated in FIG. 3A and FIG. 3B. The videoconference terminal 3 receives the image data at the communication unit 38.

Next, the data exchange unit 31 of the videoconference terminal 3 transmits, to the communication management system 5, the image data received from the image capturing device 1a (S72). At step S72, along with the image data, an image data ID identifying the image data, which is a transmission target, is also transmitted. In addition, at step S72, the IP address of the videoconference terminal 3 as a sender terminal of the image data is also transmitted. Thus, the communication management system 5 receives the image data, the image data ID, and the IP address at the data exchange unit 51.

Next, the data exchange unit 51 of the communication management system 5 transmits, to the smartphone 9, the image data received from the videoconference terminal 3 (step S73). At step S73, along with the image data, an image data ID identifying the image data, which is a transmission target is also transmitted. In addition, at step S73, the IP address of the videoconference terminal 3 as a sender terminal of the image data is also transmitted. Thus, the smartphone 9 receives the image data, the image data ID, and the IP address at the data exchange unit 91.

Next, the data storage/read unit 99 of the smartphone 9 searches the image type management DB 9001 (FIG. 15) using the image data ID received in step S73 as a search key, to read out the image type information (source name) associated with the image data ID (step S74). Then, the smartphone 9 performs a process of generating a predetermined-area image (step S75). Referring to FIG. 25, the process of step S75 is described in detail. FIG. 25 is a flowchart illustrating steps in the process of generating a predetermined-area image according to the embodiment.

First, the determination unit 95 of the smartphone 9 determines whether an image type of the image data received in step S73 is a special image (a spherical panoramic image, in the embodiment) based on the image type information read out in step S74 (step S75-1). When the determination unit 95 determines that the image type of the image data is a special image (S75-1: YES), the data storage/read unit 99 searches the applied display limit management DB 9004 (FIG. 17) using the IP address of the communication terminal as a sender terminal of the image data (in this case, the videoconference terminal 3) as a search key for searching the display control parameter associated with the IP address (step S75-2).

Next, the determination unit 95 determines whether any display control parameter associated with the IP address of the sender terminal is stored in the applied display limit management DB 9004 (step S75-3). In other words, the determination unit 95 determines whether the videoconference terminal 3, which is a sender terminal of the image data, places any limit on a predetermined-area image to be displayed by the smartphone 9. When the determination unit 95 determines that the display limit is applied (step S75-3: YES), the determination unit 95 further determines whether a display size indicated by the display control parameter is more restrictive than a default display parameter (step S75-4).

When the determination unit 95 determines that the display control parameter is more restrictive than the default display parameter (S75-4: YES), the image/audio processor 93 generates a spherical panoramic image from the image data received in step S73, and further generates a predetermined-area image based on the display control parameter (step S75-5). In this case, the image/audio processor 93 combines an icon 191 (described later) indicating a spherical panoramic image with the predetermined-area image, based on the image type information indicating a special image, such as "Video_Theta."

By contrast, when the determination unit 95 determines in step S75-3 that no display limit is applied (S75-3: NO), and when the determination unit 95 in step S75-4 determines that the display control parameter is less restrictive than the default display parameter (S75-4: NO), the image/audio processor 93 generates a spherical panoramic image from the image data received in step S73, and further generates a predetermined-area image based on the default display parameter (step S75-6). In this case, the image/audio processor 93 combines an icon 191 (described later) indicating a spherical panoramic image with the predetermined-area image, based on the image type information indicating a special image (Video_Theta).

In addition, when the determination unit 95 determines in step S75-1 that the image type of the image data is not a special image (S75-1: NO), the process of step S75 ends.

Referring again to FIG. 24, the display control unit 94 displays the predetermined-area image including the icon 191 on the display 917 of the smartphone 9 (step S76). On the other hand, when the image type information indicates "general image," i.e., when the image type information is "Video," the image/audio processor 93 does not generate a spherical panoramic image from the image data received in step S73, and the display control unit 94 displays a general image not including the icon 191.

In addition, the data exchange unit 71 to the data storage/read unit 79 of the PC 7 can perform substantially the same processes performed by the data exchange unit 91 to the data storage/read unit 99 of the smartphone 9 as described with reference to FIG. 24 and FIG. 25. More specifically, the data storage/read unit 79 of the PC 7 searches in step S74 of FIG. 24 the image type management DB 7001 (FIG. 15) using the image data ID received in step S73 as a search key, to read out the image type information (source name) associated with the image data ID. Further, the data storage/read unit 79 searches, in step S75-2 of FIG. 25, the applied display limit management DB 7003 using the IP address of the communication terminal as the sender terminal (the videoconference terminal 3, in the embodiment) as the search key to obtain the display control parameter associated with the IP address (step S75-2).

Figure 26A:
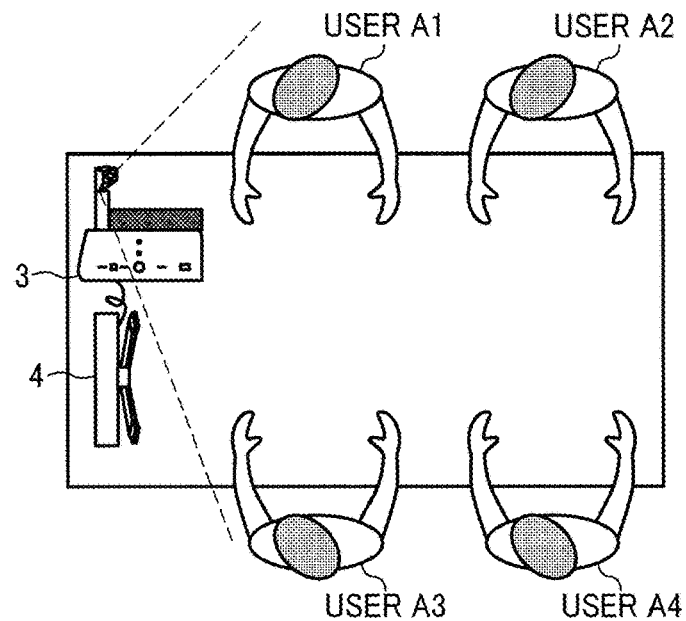
FIG. 26A is an illustration of an example state of video communication when the image capturing device of FIGS. 1A to 1C is not used, according to an embodiment of the present disclosure.
Figure 26B:
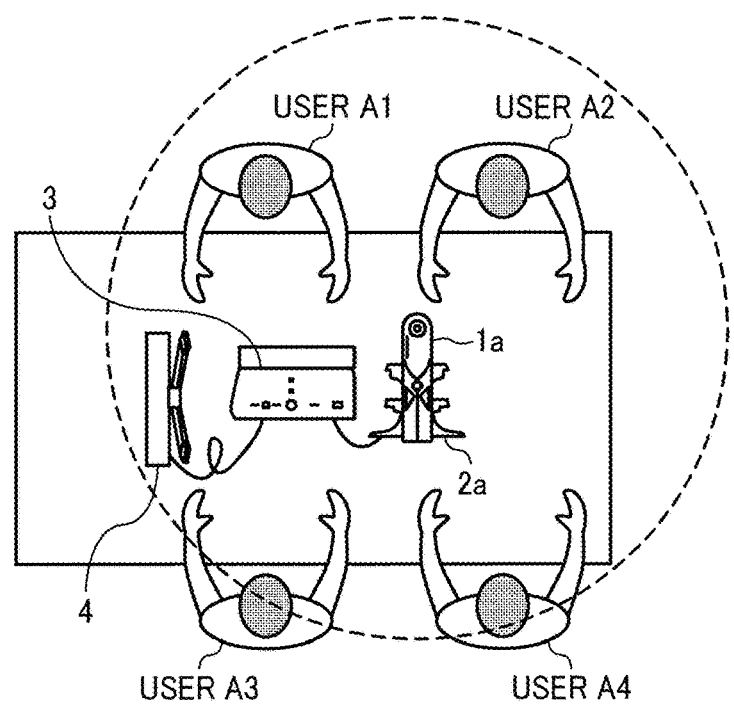
FIG. 26B is an illustration of an example state of video communication when the image capturing device of FIGS. 1A to 1C is used, according to an embodiment of the present disclosure.

Next, referring to FIG. 26A and FIG. 26B, a description is given of a state of video communication. FIG. 26A and FIG. 26B illustrate example states of video communication. More specifically, FIG. 26A illustrates a case where the image capturing device 1a is not used, while FIG. 26B illustrates a case where the image capturing device 1a is used.

As illustrated in FIG. 26A, when the camera 312 (see FIG. 11), which is built into the videoconference terminal 3, is used and the image capturing device 1a is not used, the videoconference terminal 3 has to be placed in a corner of a desk, so that the users A1 to A4 can be captured by the camera 312 having a field angle that is horizontally 125 degrees and vertically 70 degrees. This requires the users A1 to A4 to look in the direction of the videoconference terminal 3 while talking. Because the user A1 to A4 look in the direction of the videoconference terminal 3, the display 4 also has to be placed near the videoconference terminal 3. This requires the user A2 and the user A4, who are away from the videoconference terminal 3, to talk in a relatively loud voice, because they are away from the microphone 314 (FIG. 11) built in the videoconference terminal 3. Further, the user A2 and A4 may find difficulty to see contents displayed on the display 4.

By contrast, as illustrated in FIG. 26B, when the image capturing device 1a, which can obtain two hemispherical images, from which a spherical panoramic image is generated, is used, the videoconference terminal 3 and the display 4 can be placed relatively in the center of the desk. Comparing with the case where the image capturing device 1a is not used as illustrated in FIG. 26A, the users A1 to A4 can talk with a relatively low volume, because the users A1 to A4 is closer to the microphone 314. Further, it gets easier for the users A1 to A4 to see contents displayed on the display 4.

Figure 27A:
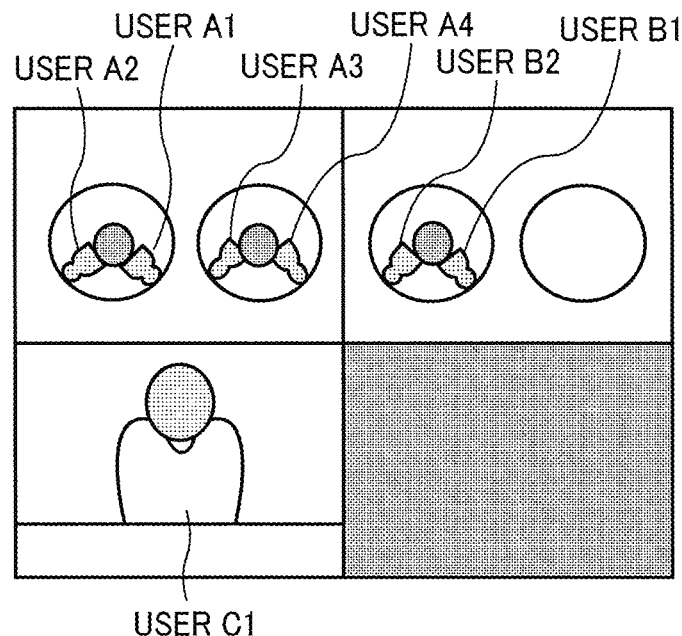
FIG. 27A is an illustration of an example of a screen of video communication in one site, in which images corresponding to image data transmitted from the image capturing device of FIGS. 1A to 1C are displayed as they are, without generating the spherical panoramic image and the predetermined-area image, according to an embodiment of the present disclosure.
Figure 27B:
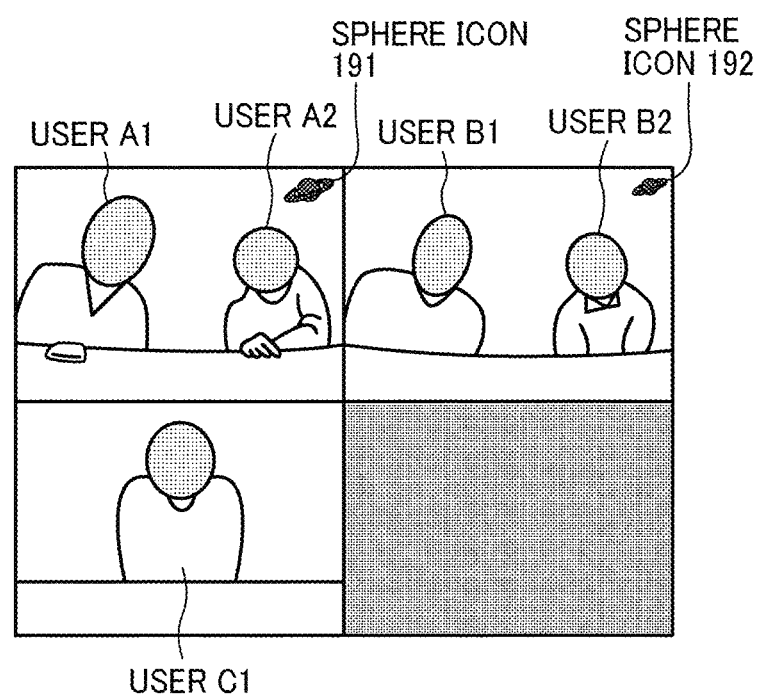
FIG. 27B is illustration of an example of another screen of the video communication in the one site, in which images are displayed after the spherical panoramic image and the predetermined-area image are generated based on image data transmitted from the image capturing device of FIGS. 1A to 1C, according to an embodiment of the present disclosure.

Next, referring to FIG. 27A and FIG. 27B, examples of a screen of the display 917 in the site B are described, according to the embodiment. FIGS. 27A and 27B illustrate examples of a screen of video communication displayed by the smartphone 9 on the display 917 in the site B. FIG. 27A is an illustration of a screen in which an image based on image data transmitted from the videoconference terminal 3 (image capturing device 1a), and another image based on image data transmitted from the image capturing device 1b are displayed without generating a spherical panoramic image and a predetermined-area image. The screen further includes still another image displayed based on image data transmitted from the PC 7 (image capturing device 8) as it is. FIG. 27B is an illustration of a screen in which predetermined-area images are displayed, which are generated based on spherical panoramic images generated from the image data transmitted from the videoconference terminal 3 (image capturing device 1a) and the image capturing device 1b, respectively. Further, in the example of FIG. 27B, image data transmitted from the PC 7 (image capturing device 8) is displayed as it is. In this example, an image of the site A is displayed in an upper-left display area of the display 917. In an upper-right display area, an image of the site B (own site) is displayed. In a lower-left display area, an image of the site C is displayed. Because in this example, simultaneous video communication is performed among the three sites, no image is displayed in a lower-right display area.

When the image data transmitted from respective ones of the image capturing device 1a and the image capturing device 1b, each being capable capturing a full spherical panoramic image, are displayed as they are, images are displayed as illustrated in FIG. 27A. In other words, the image of the site A in the upper left area and the image of the site B in the upper right area are each displayed as the front-side hemispherical image as illustrated in FIG. 3A and the back-side hemispherical image as illustrated in FIG. 3B.

On the other hand, when the image/audio processor 93 generates a spherical panoramic image based on the image data transmitted from the image capturing device 1a and the image capturing device 1b, each of which is configured to obtain two hemispherical images from which a spherical panoramic image is generated, and further generates a predetermined-area image, the predetermined-area image, which is a planar image, is displayed as illustrated in FIG. 27B Further, in both of FIG. 27A and FIG. 27B, a general image (planar image in the present embodiment) is displayed in each of the display area of the site C, because the image capturing device 8, which is an image capturing device that obtains a general image, is used in the site C.

Further, at each of the upper left corners of the images of the site A and the site B, the icon 191 indicating a spherical panoramic image is displayed. In another example, the icon 191 can be displayed at any location other than the upper left corner, such as an upper right, lower left, or lower right corner of the image. In addition, a type of the icon 191 is not limited to the one illustrated in FIG. 27B. Further, in alternative to or in addition to the icon 191, a character string such as "Spherical Image", or a combination of the icon and the character string can be used. In substantially the same manner, an icon 192 is also displayed in the display area of the site B, as illustrated in FIG. 27B.

Furthermore, a user can change a predetermined area corresponding to the predetermined-area image in the same spherical panoramic image. For example, when the user B1 or the user B2 moves his/her finger on the touch panel 921 of the smartphone 9, the acceptance unit 92 detects the movement of the finger. The display control unit 94 shifts, rotates, reduces, or enlarges the predetermined-area image based on the movement of the finger detected by the acceptance unit 92. This enables to shift the predetermined-area image so that the user A3 and the user A4 are displayed, even in a case in which the predetermined-area image displayed according to an initial setting (by default) contains only a part of the users at the site A, that is, the user A1 and the user A2 as illustrated in FIG. 27B.

<Operation of Setting Display Control Parameter>

Figure 28:
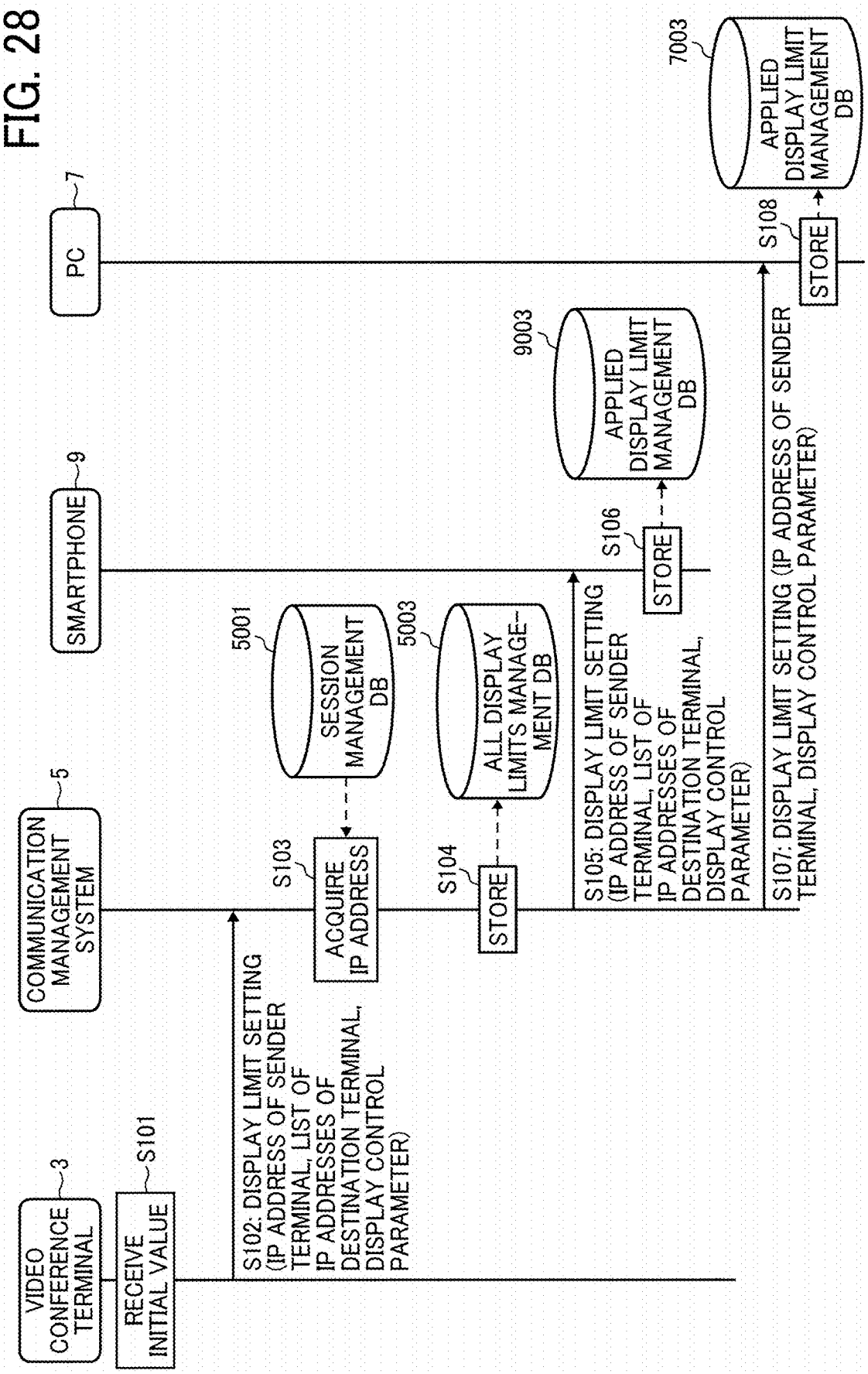
FIG. 28 is a sequence diagram illustrating an operation of setting a display control parameter, according to an embodiment of the present disclosure.

Next, referring to FIG. 28, a description is given of an operation of setting a display control parameter. FIG. 28 is a sequence diagram illustrating an operation of setting a display control parameter according to the embodiment.

First, when the user A1, A2, A3 or A4 operates the videoconference terminal 3, which is a sender terminal, to set an initial value of the display control parameter using the operation key 308, the acceptance unit 32 receives the initial value (step S101). For example, the initial value set to "α (viewing angle)>120°," according to which only a zoomed-out display is permitted.

Next, the data exchange unit 31 of the videoconference terminal 3 transmits display limit setting information indicating a setting of display limit to the communication management system 5, to notify the initial value of the display control parameter to other communication terminals located in other sites participating in the same video communication in which the videoconference terminal 3 is participating (step S102). The display limit setting information includes an IP address of the communication terminal as a sender terminal (the videoconference terminal 3, in the embodiment), a session ID, and the display control parameter that is set in step S101. Thus, the communication management system 5 receives the display limit setting information at the data exchange unit 51.

Next, the communication management system 5 searches the session management DB 5001 (FIG. 18) using the session ID included in the display limit setting information transmitted at step S102 as a search key, to read out the IP addresses of all of the communication terminals (the PC 7 and the smartphone 9, in the embodiment) other than the own terminal (the videoconference terminal 3, in the embodiment) (step S103).

Next, the data storage/read unit 59 of the communication management system 5 stores the display control parameter in each of records corresponding to the IP address of the communication terminal as a sender terminal, received in step S102 in the all display limits management DB 5003 as illustrated in FIG. 20 (step S104). At step S104, when a display control parameter has already been stored in the record corresponding to the same IP address of the communication terminal as a sender terminal, the data storage/read unit 59 overwrites the already-stored display control parameter with the display control parameter received in step S102 to update the all display limits management DB 5003.

Next, the data exchange unit 51 of the communication management system 5 transmits the display limit setting information indicating the setting of display limit to the smartphone 9 (step S105). The display limit setting information includes the IP address of the communication terminal as the sender terminal (the videoconference terminal 3, in the embodiment) and the display control parameter that is set in step S101.

The smartphone 9 receives the display limit setting information at the data exchange unit 91. The data storage/read unit 99 of the smartphone 9 stores, in the applied display limit management DB 9003, the IP address of the communication terminal as a sender terminal and the display control parameter, which are received in step S105, in association with each other (step S106) Thus, in the smartphone 9, setting of the display control parameter requested from the videoconference terminal 3 is completed.

In substantially the same manner, the data exchange unit 51 of the communication management system 5 transmits the display limit setting information indicating the setting of display limit to the PC 7 (S107). The display limit setting information includes the IP address of the communication terminal as a sender terminal (the videoconference terminal 3, in the embodiment) and the display control parameter that is set in step S101. The PC 7 receives the display limit setting information at the data exchange unit 71. The data storage/read unit 79 of the PC 7 stores, in the applied display limit management DB 7003, the IP address of the communication terminal as a sender terminal and the display control parameter, which are received in step S107, in association with each other (step S108). Thus, in the PC 7, setting of the display control parameter requested from the videoconference terminal 3 is completed.

With the operation described above, the process of setting the display control parameter ends.

<Operation of Removing Setting of Display Control Parameter (Communication Terminal to which Setting of Display Control Parameter is Applied)>

Figure 29:
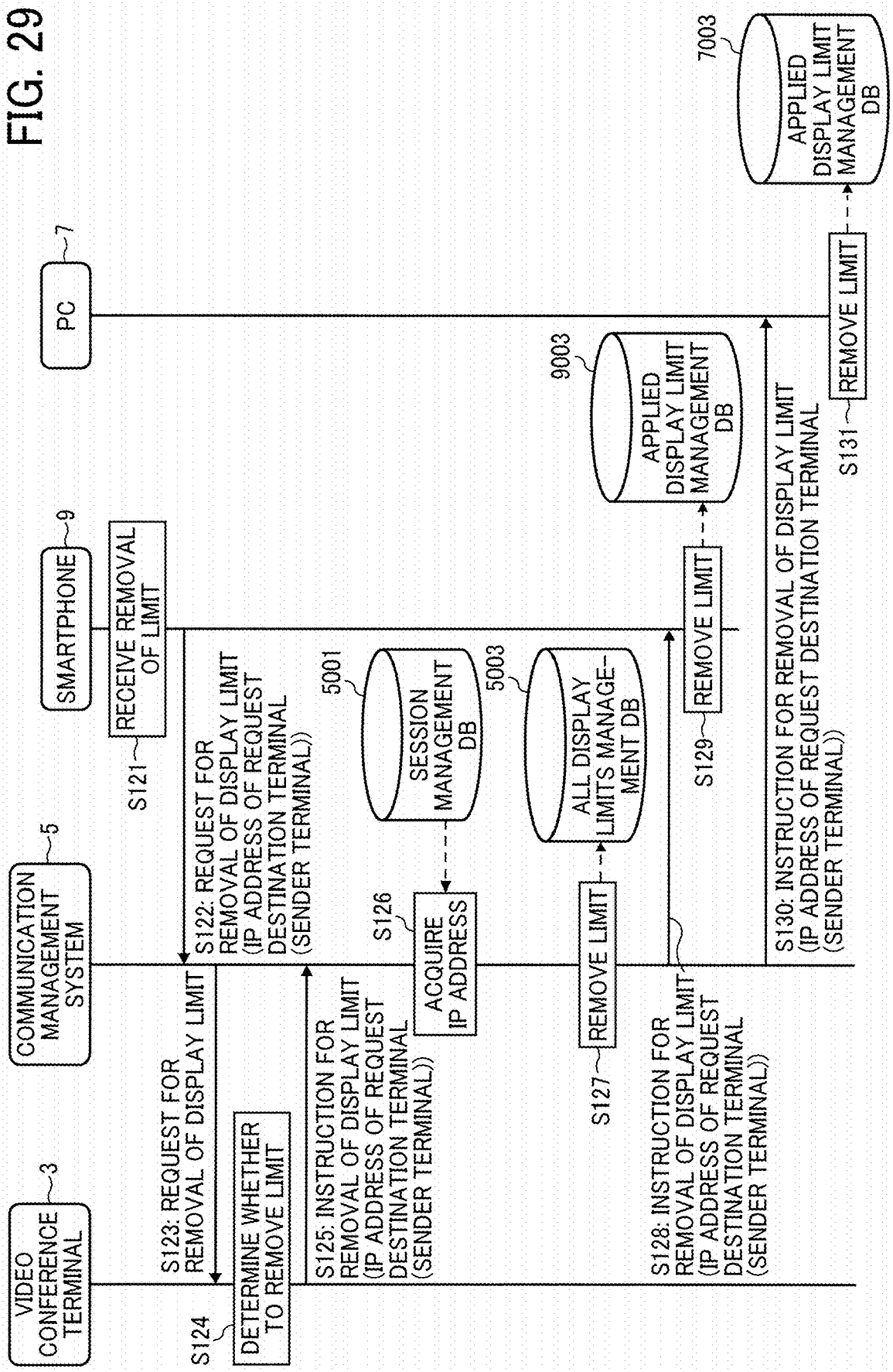
FIG. 29 is a sequence diagram illustrating an operation of removing a setting of a display control parameter in response to a request from a communication terminal to which the setting of the display control parameter is applied, according to an embodiment of the present disclosure.

Next, referring to FIG. 29, a description is given of an operation of removing (cancelling) a setting of a display control parameter in response to a request from a communication terminal to which the setting of the display control parameter is applied. FIG. 29 is a sequence diagram illustrating an operation of removing a setting of a display control parameter in response to a request from a communication terminal to which the setting of the display control parameter is applied.

For example, when a user of the smartphone 9 to which a setting of a display control parameter is applied wants to remove the display control parameter applied by the videoconference terminal 3, the user operates the smartphone 9 to remove the display limit. In response to the user's operation, the acceptance unit 92 of the smartphone 9 receives a request for removing the display limit (step S121). For example, on the screen illustrated in FIG. 27B, the user B1 of the smartphone 9 double taps a display area of video (image) for which the user B1 wants to remove the display limit applied thereto. In this example, the user B1 double taps the upper-left display area displaying the user A1 and the user A2.

Next, the data exchange unit 91 transmits display limit removal request information indicating a request for removing a display limit to the communication management system 5 (step S122). The display limit removal request information includes an IP address of the communication terminal as a request sender terminal (the smartphone 9, in the embodiment) and an IP address of the communication terminal as a request destination terminal (the videoconference terminal 3, in the embodiment). The communication terminal as the request sender terminal is the communication terminal as the destination terminal that has received the setting of display limit. Further, the communication terminal as the request destination terminal is the communication terminal as the sender terminal that sends the setting of display limit. Thus, the communication management system 5 receives the display limit removal request information at the data exchange unit 51.

The data exchange unit 51 transmits the display limit removal request information received in step S122 to the videoconference terminal 3 (step S123). The display limit removal request information includes the IP address of the communication terminal as the request sender terminal (the smartphone 9, in the embodiment) received in step S122. The videoconference terminal 3 receives the display limit removal request information at the data exchange unit 31.

Figure 31:
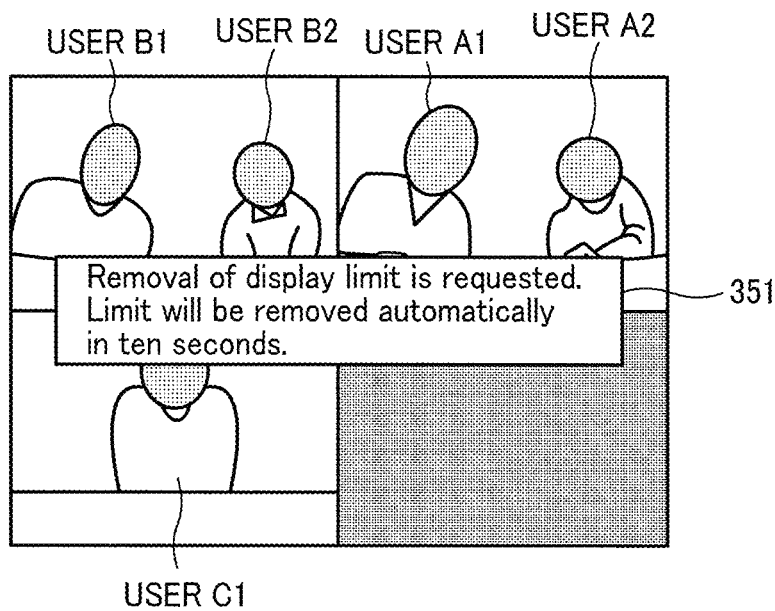
FIG. 31 is an illustration of an example of a video communication screen including a notification dialog box, according to an embodiment of the present disclosure.

Next, the determination unit 35 performs limit removal determination (step S124). For example, the image/audio processor 33 outputs a notification sound notifying the user A1, A2, A3 and A4 of the request for removal of display limit. In another example, the image/audio processor 33 displays a dialog box 351 as illustrated in FIG. 31. FIG. 31 is an illustration of an example of a video communication screen including the dialog box 351. For example, the data storage/read unit 39 of the videoconference terminal 3 can temporarily remove the display control parameter automatically when a certain time period (e.g., 10 seconds) has passed since the output of the notification sound. In addition, the display control parameter that has been temporarily removed can be restored when a predetermined time period (e.g., 10 minutes) has passed since the removal. In another example, the temporarily-removed display control parameter can be restored in response to a restoration instruction given by the communication terminal as the sender terminal that instructed display control.

Figure 32:
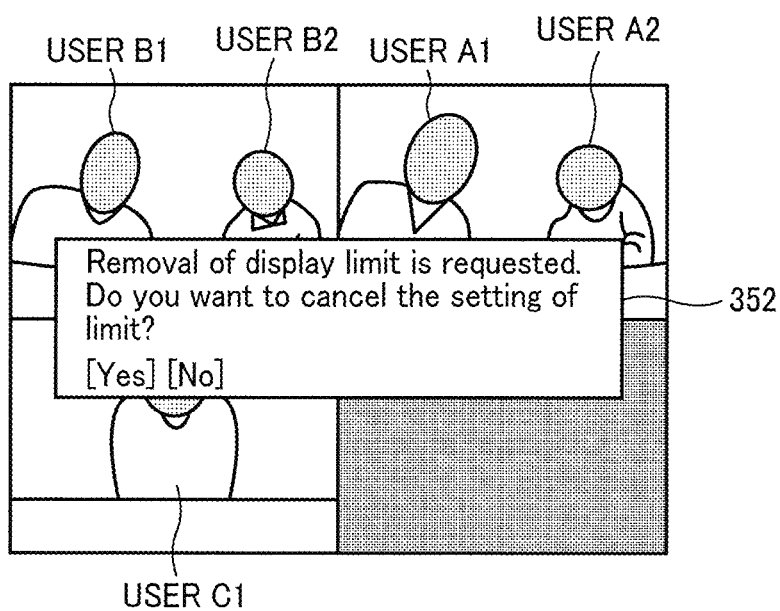
FIG. 32 is an illustration of an example of a video communication screen including an approval request dialog box, according to an embodiment of the present disclosure.

In another example, in step S124, the display control unit 34 displays an approval request dialog box 352, as illustrating in FIG. 32, requesting the user A1, A2, A3 and/or A4 using the communication terminal as the request destination terminal (the videoconference terminal 3, in the embodiment) for approval of the removal of the display limit. FIG. 32 is an illustration of an example of a video communication screen including the approval request dialog box 352.

The approval request dialog box 352 includes a "Yes" button to be pressed when the user approves the request and a "No" button to be pressed when the user does not approve the request. When the request is approved, the operation proceeds to the next step S125. By contrast, when the request is not approved, the data exchange unit 31 transmits a notification indicating that the request is not approved (denied) to the communication terminal as the request sender terminal (the smartphone 9, in the embodiment) via the communication management system 5.

Next, the data exchange unit 31 of the videoconference terminal 3 transmits display limit removal instruction information indicating that the display limit is to be removed to the communication management system 5 (step S125). The display limit removal instruction information includes an IP address of the communication terminal as the request destination terminal (the sender terminal) and the session ID. Thus, the communication management system 5 receives the display limit removal instruction information at the data exchange unit 51.

Next, the data storage/read unit 59 of the communication management system 5 searches the session management DB 5001 using the session ID received in step S125 as a search key to obtain the IP addresses of the communication terminals as the request destination terminals (the sender terminals) participating in the videoconference (step S126).

Further, the data storage/read unit 59 searches the all display limits management DB 5003 using the acquired IP addresses of the communication terminals as the request destination terminals (the sender terminals) as a search key and temporarily deletes the corresponding display control parameter to remove the display limit (step S127).

Then, the data exchange unit 51 transmits the display limit removal instruction information indicating that the removal of the display limit has been completed to the smartphone 9, which is a communication terminal participating in the videoconference (step S128). The display limit removal instruction information includes the IP address of the communication terminal as the request destination terminal (the sender terminal) received in step S125. The smartphone 9 receives the display limit removal instruction information at the data exchange unit 91.

Next, the smartphone 9 performs a process of removing the display limit (step S129) For example, the data storage/read unit 99 searches the applied display limit management DB 9003 using the IP address of the communication terminal set as the request destination terminal (i.e., the above described sender terminal such as the videoconference terminal 3, in the embodiment) received in step S128 as a search key to temporarily delete the corresponding display control parameter. As a result, the smartphone 9 determines that no display limit is applied in step S75-3 of FIG. 25. Accordingly, the image/audio processor 93 causes the display 917 to display the predetermined-area image according to an operation by the users B1 and B2.

Further, the data exchange unit 51 transmits the display limit removal instruction information indicating that the removal of the display limit has been completed to the PC 7, which is a communication terminal participating in the videoconference (step S130). The display limit removal instruction information includes the IP address of the communication terminal as the request destination terminal (the sender terminal) received in step S125. The PC 7 receives the display limit removal instruction information at the data exchange unit 71.

Next, the PC 7 performs a process of removing the display limit (step S131). For example, the data storage/read unit 79 searches the applied display limit management DB 7003 using the IP address of the communication terminal as the request destination terminal (the sender terminal) (the videoconference terminal 3, in the embodiment) received in step S127 as a search key to temporarily delete the corresponding display control parameter. As a result, the PC 7 determines that no display limit is applied in step S75-3 of FIG. 25. Accordingly, the image/audio processor 73 causes the display 508 to display the predetermined-area image according to an operation by the users C1.

Thus, the operation for removing the setting of the display control parameter in response to the request from the communication terminal that receives the setting of the display limit ends.

<Operation of Removing Setting of Display Control Parameter (Communication Terminal that Applies Setting of Display Control Parameter)>

Figure 30:
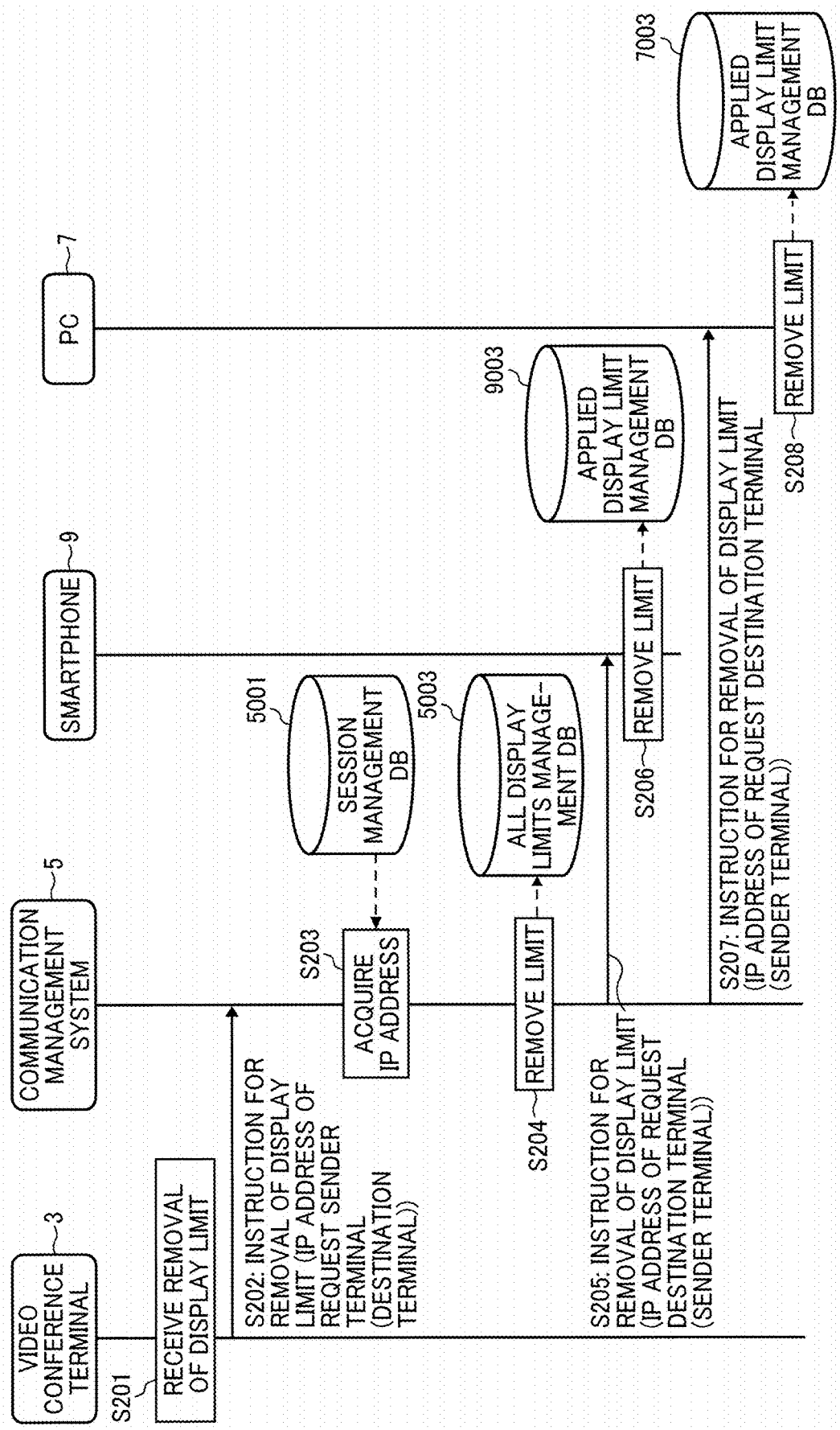
FIG. 30 is a sequence diagram illustrating an operation of removing a setting of a display control parameter in response to a request from a communication terminal that applies the setting of the display control parameter, according to an embodiment of the present disclosure.

Next, referring to FIG. 30, a description is given of an operation of individually removing a setting of a display control parameter in response to a request from a communication terminal that applies the setting of the display control parameter. FIG. 30 is a sequence diagram illustrating an operation of removing a setting of a display control parameter in response to a request from a communication terminal that applies the setting of the display control parameter.

For example, when the user A1, A2, A3 or A4 operates the videoconference terminal 3, which controls the setting of the display limit to remove the display limit, during the video communication, the display control unit 34 receives the removal of the currently-applied display limit (step S201). One example of the user's operation for removing the display limit is double clicking of video (image) of the own site being distributed. In another example, when the spherical image (video) becomes bright, it is detected as the operation for removing the display limit. In other words, the display limit is applied when an office is dark during a lunch break as a room light is off, and the display limit is removed when the room is lighted when the lunch break is over and the room light is turned on. In still another example, when a person approaches the camera or when a specific word or a specific volume of voice is detected, it is detected as the operation for removing the display limit.

Next, the data exchange unit 31 of the videoconference terminal 3 transmits display limit removal instruction information indicating that the display limit is to be removed to the communication management system 5 (step S202). The display limit removal instruction information includes an IP address of the own terminal (the sender terminal that sends the display limit setting information) and the session ID. The communication management system 5 receives the display limit removal instruction information at the data exchange unit 51.

Next, the data storage/read unit 59 of the communication management system 5 searches the session management DB 5001 using the session ID received in step S202 as a search key to obtain the IP addresses of the communication terminals (the destination terminals each of which receives the display limit setting information) participating the videoconference (step S203).

Further, the data storage/read unit 59 searches the all display limits management DB 5003 using the IP address of the communication terminal as the sender terminal received at S202 as a search key and temporarily deletes the corresponding display control parameter to remove the display limit (step S204).

Then, the data exchange unit 51 transmits the display limit removal instruction information indicating that the removal of the display limit has been completed to the smartphone 9, which is a communication terminal participating in the videoconference (step S205). This display limit removal instruction information includes the IP address of the communication terminal as the sender terminal received at step S202. The smartphone 9 receives the display limit removal instruction information at the data exchange unit 91.

Next, the smartphone 9 performs a process of removing the display limit (step S206). For example, the data storage/read unit 99 searches the applied display limit management DB 9003 using the IP address of the communication terminal as the sender terminal (the videoconference terminal 3, in the embodiment) received in step S205 as a search key to temporarily delete the corresponding display control parameter. As a result, the smartphone 9 determines that no display limit is applied in step S75-3 of FIG. 25. Accordingly, the image/audio processor 93 causes the display 917 to display the predetermined-area image according to an operation by the users B1 and B2.

Further, the data exchange unit 51 transmits the display limit removal instruction information indicating that the removal of the display limit has been completed to the PC 7, which is a communication terminal participating in the videoconference (step S207). This display limit removal instruction information includes the IP address of the communication terminal as the sender terminal received at step S202. The PC 7 receives the display limit removal instruction information at the data exchange unit 71.

Next, the PC 7 performs a process of removing the display limit (step S208). For example, the data storage/read unit 79 searches the applied display limit management DB 7003 using the IP address of the communication terminal as the sender terminal (the videoconference terminal 3, in the embodiment) received in step S207 as a search key to temporarily delete the corresponding display control parameter. As a result, the PC 7 determines that no display limit is applied in step S75-3 of FIG. 25. Accordingly, the image/audio processor 73 causes the display 508 to display the predetermined-area image according to an operation by the users C1.

FIG. 33 is a sequence diagram illustrating an operation of participating a specific communication session, according to the embodiment.

When a user in the site C (e.g., user C1) operates the PC 7 to display the session selection screen for selecting a desired communication session (virtual conference room), the acceptance unit 72 receives the operation to display the session selection screen. Accordingly, the display control unit 74 causes the display 508 to display the session selection screen as illustrated in FIG. 22 (step S221). In the session selection screen, selection buttons b1, b2, and b3 are displayed. The selection buttons b1, b2, and b3 respectively indicates virtual conference rooms R1, R2, R3, each of which is a selection target. Each of the selection buttons b1, b2, and b3 is associated with a corresponding session ID.

When the user C1 selects a desired selection button (in this example, the selection button b1) on the session selection screen, the acceptance unit 72 receives selection of a corresponding communication session (step S222).

Next, the data exchange unit 71 transmits a request to participate in the communication session, namely to enter the corresponding virtual conference room, to the communication management system 5 (step S223). This participation request includes a session ID identifying the communication session for which the selection is received at step S222, and the IP address of the PC 7, which is a request sender terminal. The communication management system 5 receives the participation request at the data exchange unit 51.

Next, the data storage/read unit 59 performs a process for causing the PC 7 to participate in the communication session (step S224). More specifically, the data storage/read unit 59 adds, in the session management DB 5001 (FIG. 19), the IP address that is received at step S223 to a field of the participant terminal IP address in a record of the session ID that is the same as the session ID received at step S223.

The data exchange unit 51 transmits a response to the participation request to the PC 7 (step S225). This response to the participation request includes the session ID that is received in step S223, and a result of the participation process. The PC 7 receives the response to the participation request at the data exchange unit 71.

Next, in step S226, the data storage/read unit 79 reads out, from the all display limits management DB 5003 (FIG. 20), the display control parameter for each of the IP addresses of participating terminals in the record of the session ID received in step S223.

Next, the data exchange unit 51 of the communication management system 5 transmits the display limit setting information indicating the setting of display limit to the PC 7 (S227). This display limit setting information includes the IP address of the communication terminal as the sender terminal and the display control parameter that is applied by each of the communication terminals as the sender terminals. The PC 7 receives the display limit setting information at the data exchange unit 71. Next, the data storage/read unit 79 of the PC 7 stores, in the applied display limit management DB 7003, the IP address of the communication terminal as the sender terminal and the display control parameter, which are received in step S227, in association with each other (step S228). Thus, in the PC 7, setting of the display control parameter requested from the videoconference terminal 3 is completed.

Figure 34A:
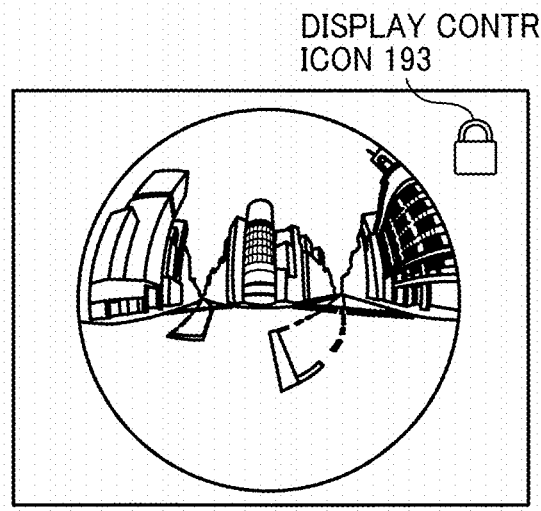
FIG. 34A is an illustration of an example of a screen displayed when a setting of the display control parameter is applied, according to an embodiment of the present disclosure.
Figure 34B:
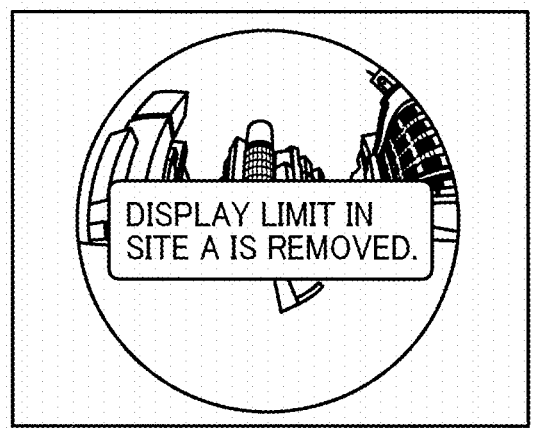
FIG. 34B is an illustration of an example of a screen displayed when a setting of the display control parameter is removed, according to an embodiment of the present disclosure.
Figure 34C:
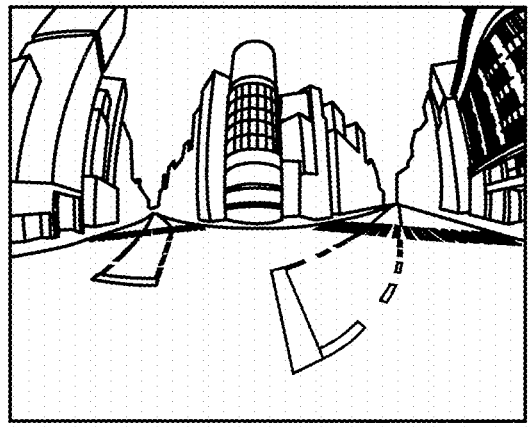
FIG. 34C is an illustration of a screen to which no setting of display control parameter is applied, according to an embodiment of the present disclosure.

Next, referring to FIG. 34A to FIG. 34C, examples of a screen of the display 508 in the site C are described, according to the embodiment. FIG. 34A to FIG. 34C illustrate examples of a screen of video communication including an image of the site A displayed by PC 7 on the display 508 in the site B.

FIG. 34A illustrates a screen displayed when the setting of display control parameter is applied. In the upper right corner of the screen illustrated in FIG. 34A, a display control icon 193 indicating that the currently displayed image is an image applied with a display limit. When the display limit applied by the videoconference terminal 3 provided in the site A is removed, a message indicating that the display limit of the site A has been removed is displayed as illustrated in FIG. 34B.

FIG. 34C is an illustration of a screen displayed when no display limit is applied. Since the display control icon 193 is not displayed, the user C1 can recognize that no display limit is applied. When the display limit is again applied to the screen of FIG. 34C, the screen as illustrated in FIG. 34A is displayed. Although in the example of FIG. 34A, the display control icon 193 is displayed in the upper right corner, in another example, the display control icon 193 is displayed at any other suitable position such as in a lower right corner, an upper left corner, a lower left corner. In addition, a type of the display control icon 193 is not limited to the one illustrated in FIG. 34A. Further, in alternative to or in addition to the display control icon 193, a message such as "Display is limited", or a combination of the icon and the message can be used to indicated that the display limit is being applied.

In addition, in this disclosure, the spherical panoramic image does not have to be a full-view (360-degree) spherical image. For example, the spherical image can be a wide-angle view image having an angle of about 180 to 360 degrees in the horizontal direction.

As described heretofore, according to the present embodiment, the communication terminal such as the videoconference terminal 3 generates a spherical panoramic image, and further generates a predetermined-area image, based on the image type information associated with the image data ID transmitted with image data. This prevents the front-side hemispherical image and the back-side hemispherical image from being displayed as illustrated in FIG. 3A.

Further, the communication management system 5 sets the display limit for the communication terminals on the receiving side managed by the same session identification information (steps S102 to S108) and/or removes the display limit applied to the communication terminals on the receiving side (steps S121 to S131 or steps S201 to S208). This enables a user in a site on the receiving side to recognize the entire state of each of the other sites on the receiving side than the own site.

According to the conventional techniques, there can be a case where a user in a receiving side site that receives image data cannot recognize the entire state of a transmitting side site.

One or more embodiments of the present disclosure, a demand is satisfied that a user in a receiving side site that receives image data can recognize an entire state of a transmitting side site.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments can be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. A communication management system for relaying communication between a first communication terminal that transmits data of a spherical image and a plurality of second communication terminals each of which receives the data of the spherical image, the communication management system comprising:
   a memory configured to store session identification information for identifying a video communication session in association with addresses of communication terminals participating in the video communication session; and
   circuitry configured to
      receive, from the first communication terminal, particular session identification information identifying a particular video communication session, and a display control parameter for limiting a display area of the spherical image to be displayed by each of the plurality of second communication terminals in the particular video communication session to a part of an entire area of the spherical image;
      transmit the display control parameter to each of the addresses stored in the memory in association with the particular session identification information other than an address of the first communication terminal;
      receive, from the first communication terminal, the particular session identification information and display limit removal instruction information indicating an instruction for removing a limit set on the display area; and
      transmit the display limit removal instruction information to each of the addresses stored in the memory in association with the particular session identification information other than the address of the first communication terminal.

2. The communication management system of claim 1, wherein
   the circuitry is further configured to:
      receive display limit removal request information indicating a request for removing the limit set on the display area from one or more of the plurality of second communication terminals; and
      transmits the display limit removal request information to the first communication terminal.

3. The communication management system of claim 1, further comprising:
   a communication terminal being at least one of the first communication terminal and the plurality of second communication terminals.

4. A communication system comprising:
a first communication terminal, including first circuitry, configured to transmit data of a spherical image;
a plurality of second communication terminals each of which receives the data of the spherical image; and
a communication management system configured to relay communication between the first communication terminal and the plurality of second communication terminals, the communication management system including second circuitry, and a memory configured to store session identification information for identifying a video communication session in association with addresses of communication terminals participating in the video communication session, wherein
  the first circuitry of the first communication terminal transmits, to the communication management system, particular session identification information identifying a particular video communication session, and a display control parameter based for limiting a display area of the spherical image to be displayed by each of the plurality of second communication terminals in the particular video communication session to a part of an entire area of the spherical image, and
  the second circuitry of the communication management system transmits the display control parameter to each of the addresses stored in the memory in association with the particular session identification information other than an address of the first communication terminal,
  the first circuitry of the first communication terminal is further configured to transmit display limit removal instruction information indicating an instruction for removing a limit set on the display area, and
  the second circuitry of the communication management system is further configured to transmit the display limit removal instruction information to each of the addresses stored in the memory in association with the particular session identification information other than the address of the first communication terminal.

5. The communication system of claim 4, wherein
each of the plurality of second communication terminals includes third circuitry to transmit display limit removal request information indicating a request for removing a limit set on the display area to the communication management system,
the second circuitry of the communication management system is further configured to transmit the display limit removal request information to the first communication terminal,
the first circuitry of the first communication terminal is further configured to, in response to receiving the display limit removal request information, transmit the particular session identification information and display limit removal instruction information to the communication management system, and
the second circuitry of the communication management system is further configured to transmit the display limit removal instruction information to each of the addresses stored in the memory is association with the particular session identification information other than the address of the first communication terminal.

6. The communication system of claim 4, wherein
the first circuitry of the first communication terminal is further configured to receive an input of display limit removal request information,
the second circuitry of the communication management system is further configured to transmit the display limit removal request information to the first communication terminal,
the first circuitry of the first communication terminal is further configured to, in response to receiving the display limit removal request information, transmit the particular session identification information and display limit removal instruction information to the communication management system, and
the second circuitry of the communication management system is further configured to transmit the display limit removal instruction information to each of the addresses stored in the memory is association with the particular session identification information other than the address of the first communication terminal.

7. A method of controlling display of a spherical image, the method comprising:
transmitting, from a first communication terminal, a display control parameter to be received by each of a plurality of second communication terminals, the display control parameter limiting a display area of the spherical image to be displayed by each of the plurality of second communication terminals to a part of an entire area of the spherical image;
transmitting, from the first communication terminal, display limit removal request information indicating a request for removing a limit set on the display area, to one or more of the plurality of second communication terminals that receive a same display control parameter among the plurality of second communication terminals;
receiving, from the first communication terminal, particular session identification information and display limit removal instruction information indicating an instruction for removing the limit set on the display area; and
transmitting the display limit removal instruction information to addresses stored in a memory in association with the particular session identification information other than an address of the first communication terminal.

8. The method according to claim 7, further comprising:
receiving display limit removal request information indicating a request for removing the limit set on the display area from one or more of the plurality of second communication terminals; and
transmitting the display limit removal request information to the first communication terminal.

* * * * *